US012568033B2

(12) United States Patent
Kucera

(10) Patent No.: US 12,568,033 B2
(45) Date of Patent: Mar. 3, 2026

(54) METHOD FOR CONTROLLING DATA TRANSMISSION BY USING NETWORK SLICES

(71) Applicant: Nokia Technologies Oy, Espoo (FI)

(72) Inventor: Stepan Kucera, Dublin (IE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/772,292

(22) PCT Filed: Dec. 15, 2017

(86) PCT No.: PCT/EP2017/083078
§ 371 (c)(1),
(2) Date: Jun. 12, 2020

(87) PCT Pub. No.: WO2019/114988
PCT Pub. Date: Jun. 20, 2019

(65) Prior Publication Data
US 2021/0084523 A1     Mar. 18, 2021

(51) Int. Cl.
*H04W 28/06*        (2009.01)
*H04L 41/0895*      (2022.01)
(Continued)

(52) U.S. Cl.
CPC ...... *H04L 43/0864* (2013.01); *H04L 41/0895* (2022.05); *H04L 41/0896* (2013.01); (Continued)

(58) Field of Classification Search
CPC ............. H04L 41/0896; H04L 41/0806; H04L 43/0864; H04W 28/06; H04W 28/0268
See application file for complete search history.

(56) References Cited

U.S. PATENT DOCUMENTS

2015/0163273 A1*  6/2015  Radcliffe ............ H04L 43/0894
                                                    709/231
2017/0064028 A1*  3/2017  Westphal .............. H04L 67/568
(Continued)

FOREIGN PATENT DOCUMENTS

CN        106954267 A      7/2017
CN        106973413 A      7/2017
(Continued)

OTHER PUBLICATIONS

EP Search Report mailed in corresponding EP Application No. 17 825 185.6 on Jun. 29, 2021, 10 pages.
(Continued)

*Primary Examiner* — Syed Ali
(74) *Attorney, Agent, or Firm* — Tong, Rea, Bentley & Kim, LLC

(57) ABSTRACT
Method of controlling transmission of a data flow in a communication network, comprising defining a quality of service setting for at least one data flow to be transmitted in the communication network, associating at least one network slice to the at least one data flow to be transmitted, wherein the at least one network slice consists of at least one data transport service using communication resources of the communication network, and causing a protected delivery of the at least one data flow by using the associated network slice.

14 Claims, 16 Drawing Sheets

(51) Int. Cl.

| | |
|---|---|
| *H04L 41/0896* | (2022.01) |
| *H04L 41/40* | (2022.01) |
| *H04L 43/0864* | (2022.01) |
| *H04L 43/20* | (2022.01) |
| *H04W 28/02* | (2009.01) |

(52) U.S. Cl.
CPC .............. *H04L 41/40* (2022.05); *H04L 43/20* (2022.05); *H04W 28/0268* (2013.01); *H04W 28/06* (2013.01)

(56) References Cited

U.S. PATENT DOCUMENTS

| | | | | |
|---|---|---|---|---|
| 2017/0141973 A1* | 5/2017 | Vrzic | .................... | H04W 16/02 |
| 2017/0317894 A1* | 11/2017 | Dao | .................... | H04L 41/5009 |
| 2020/0029242 A1* | 1/2020 | Andrews | ............... | H04W 24/10 |
| 2021/0075697 A1* | 3/2021 | Dattagupta | ........... | H04L 41/342 |
| 2021/0204198 A1* | 7/2021 | Xin | ................... | H04W 28/0268 |

FOREIGN PATENT DOCUMENTS

| | | | | |
|---|---|---|---|---|
| CN | 107113195 A | 8/2017 | | |
| CN | 107426776 A | 12/2017 | | |
| WO | 2017117044 A1 | 7/2017 | | |
| WO | WO-2017200978 A1 * | 11/2017 | ............. | H04L 41/28 |

OTHER PUBLICATIONS

EP Search Report mailed in corresponding EP Application No. 17 825 185.6 on Nov. 17, 2022, 12 pages.

Communication pursuant to Article 94(3) EPC mailed in corresponding EP Application No. 17 825 185.6-1213 on Mar. 22, 2024, pp. 9.

Decision of Rejection mailed in corresponding CN Application No. 2017 8009 7708.5 on Jan. 17, 2024, pp. 6.

Nokia, "Reduce latency to milliseconds," retrieve from the Wayback Machine, dated Jul. 31, 2017, 1 page.

Huawei, "5G Vision: 100 Billion connections, 1 ms Latency, and 10 Gbps Throughput," retrieved from the Wayback Machine, dated Oct. 20, 2017, 4 pages.

Ericsson, "Prioritizing Reliable Communication," dated Sep. 29, 2017, 14 pages.

ZTE, "ZTE releases industry's first IP + Optical 5G Flexhaul transport solution," dated Feb. 28, 2017, 4 pages.

Ericsson, "5G Systems," Enabling the Transformation of Industry and Society, UEN 284-3251 Rev B, dated Jan. 2017, 14 pages.

Huawei, "5G: A Technology Vision," Version No. M3-023985-20131104-C-1.0, dated Sep. 8, 2017, 16 pages.

Zhu et al., "User-Plane Protocols for Multiple Access Management Service," Internet Draft, MAMS u-plane protocols, dated Aug. 2017, 16 pages.

Chandra et al., "MultiNet: Connecting to Multiple IEEE 802.11 Networks Using a Single Wireless Card," Cornell University, One Microsoft Way, dated Apr. 2004, 12 pages.

* cited by examiner

USER DEVICE

101

102

10

APP

MX convergence layer transport layer

MX adaptation layer

MUX

MX convergence layer transport layer

MX adaptation layer

4G / 5G / Wifi / Wigig

Android kernel

You Tube

TCP / UDP

IP

VPN Interface (FROM FIG. 5A, ACCESS STRATUM IN 25)

(TO FIG. 5B, RGW40)

best-effort networking with starving latency-oriented flows

METHOD FOR CONTROLLING DATA TRANSMISSION BY USING NETWORK SLICES

CROSS-REFERENCE TO RELATED APPLICATIONS

The present application is a § 371 application of Patent Application Serial No. PCT/EP2017/083078, entitled "METHOD FOR CONTROLLING DATA TRANSMIS- SION BY USING NETWORK SLICES" and filed on Dec. 15, 2017, the entirety of which is incorporated by reference herein.

BACKGROUND

Field

The present invention relates to apparatuses, methods, systems, computer programs, computer program products and computer-readable media usable for controlling a trans- mission of data in a communication network by using network slices, and in particular to a framework for network slicing allowing to improve traffic under consideration of QoS requirements.

Background Art

The following description of background art may include insights, discoveries, understandings or disclosures, or asso- ciations, together with disclosures not known to the relevant prior art, to at least some examples of embodiments of the present invention but provided by the invention. Some of such contributions of the invention may be specifically pointed out below, whereas other of such contributions of the invention will be apparent from the related context.

The following meanings for the abbreviations used in this specification apply:

3GPP 3rd Generation Partner Project
ACK acknowledgment
APP application
BS base station
CN core network
CPU central processing unit
CWND congestion window
DL downlink
DSL digital subscriber line
eNB evolved node B
EPC evolved packet core
ETSI European Telecommunications Standards Institute
GRE generic routing encapsulation
GW gateway
HAG hybrid access gateway
ICMP Internet Control Message Protocol
IETF Internet engineering task force
IP Internet protocol
ISP Internet service provider
L2TP layer 2 tunneling protocol
LEAP latency end-to-end aggregation protocol
LTE Long Term Evolution
LTE-A LTE Advanced
LWA LTE Wifi Aggregation
LWIP LTE/Wifi IP-layer aggregation
MAMS multi access management services
MPTPC multi-path tcp
MPLS multi protocol label switching
MUX multiplexer MX multi access
NAT network address translation
NR new radio
OS operating system
PDCP packet data convergence protocol
PDN public data network
P-GW packet gateway
QoS quality of service
RAN radio access network
RGW residential gateway
RTT round trip time
RWND advertised receiver window
SRV server
SIM subscriber identity module
SSID service set identifier
TCP transport layer protocol
UDP user data plane
UE user equipment
UL uplink
UMTS universal 5 mobile telecommunication system
VLAN virtual local area network
VPN virtual private network
Wifi wireless fidelity

SUMMARY

According to an example of an embodiment, there is provided, for example, a method of controlling transmission of a data flow in a communication network, comprising defining a quality of service setting for at least one data flow to be transmitted in the communication network, associating at least one network slice to the at least one data flow to be transmitted, wherein the at least one network slice consists of at least one data transport service using communication resources of the communication network, and causing a protected delivery of the at least one data flow by using the associated network slice.

Furthermore, according to an example of an embodiment, there is provided, for example, an apparatus for use by a core network control element or function configured to execute a control of a transmission of a data flow in a communication network, the apparatus comprising at least one processing circuitry, and at least one memory for storing instructions to be executed by the processing circuitry, wherein the at least one memory and the instructions are configured to, with the at least one processing circuitry, cause the apparatus at least: to define a quality of service setting for at least one data flow to be transmitted in the communication network, to associate at least one network slice to the at least one data flow to be transmitted, wherein the at least one network slice consists of at least one data transport service using communication resources of the communication network, and to cause a protected delivery of the at least one data flow by using the associated network slice.

Furthermore, according to an example of an embodiment, there is provided, for example, a system for controlling a transmission of a data flow in a communication network, the system comprising a plurality of network control elements or functions involved in a communication including the transmission of the at least one data flow, wherein one or more of the plurality of network control elements or func- tions is configured, individually or in cooperation, to define a quality of service setting for at least one data flow to be transmitted in the communication network, to associate at least one network slice to the at least one data flow to be transmitted, wherein the at least one network slice consists of at least one data transport service using communication resources of the communication network, and to cause a protected delivery of the at least one data flow by using the associated network slice.

According to further refinements, these examples may include one or more of the following features:

defining the quality of service setting for the at least one data flow to be transmitted in the communication network may include to set a minimum quality of service on the basis of at least one of requirements of an operator of the communication network, requirements indicated by a user involved in a communication including the transmission of the at least one data flow, requirements indicated by profile settings of an application involved in a communication including the transmission of the at least one data flow, and requirements indicated by configuration data of a network element or function involved in a communication including the transmission of the at least one data flow;

the minimum quality of service may be set for an application involved in the communication including the transmission of the at least one data flow by using at least one of a default application profile, a dynamic operator policy and an on-demand user command;

associating the at least one network slice to the at least one data flow to be transmitted may comprise defining a transport protocol belonging to the at least one network slice, and selecting a network module for implementing a generation of data flow packets to be transmitted in the at least one associated network slice;

the at least one network slice may be a capacity-oriented network slice giving priority of an amount of data to be transmitted, or a latency-oriented network slice giving priority of a latency of data transmission;

the transport protocol belonging to the at least one network slice may be related to at least one of a multi-connectivity service for best-effort capacity aggregation, a multi-connectivity service for quality of service aware capacity aggregation, and a complementary service for asymmetric data routing;

the selected network module for implementing the generation of data flow packets may be provided by a kernel-space service of at least one network element or function involved in a communication including the transmission of the at least one data flow, a user-space function implemented and running in at least one network element or function involved in a communication including the transmission of the at least one data flow, or a kernel-space service of at least one network element or function involved in a communication including the transmission of the at least one data flow and a user-space function implemented and running in the at least one network element or function involved in the communication including the transmission of the at least one data flow;

causing the protected delivery of the at least one data flow by using the associated network slice may comprise isolating slice flows for transmitting the data flow via mutually exclusive resources of the communication network, and allocating resources of the communication network to the at least one network slice for transmitting the data flow;

slice flows for transmitting the data flow may be isolated on one of a physical layer, a data link layer, a network layer and a transport layer of a communication function layer model of the communication network; the slice flows for transmitting the data flow may be isolated, on physical layer, by using different access technologies for respective slice flows, on the data link layer, by generating connections to different virtual local area networks for respective slice flows, on the network layer, by providing paths to different paths to gateways for respective slice flows, or on the transport layer, by controlling a data rate for data transmission by setting at least one state variable of the transport layer to a specified value;

the slice flows for transmitting the data flow may be isolated, on the data link layer and the network layer, by multiplexing at least one of virtual access devices, delivery tunnels and subnetworks, and on the transport layer, by controlling at least one of congestion windows and advertised receiver windows;

allocating resources of the communication network to the at least one network slice for transmitting the data flow may comprise dynamically allocating the resources of the communication networks to the isolated slice flows in accordance with traffic requirements for the delivery of the data flow;

the method/apparatus/system may be implemented, at least in part, in at least one of a network control element or function of the communication network capable for multi connectivity communication, the network control element or function including at least one of a communication element or function acting as a user equipment, a core network control element or function, an access network element or function, a gateway network element or function, a hybrid access gateway element or function, and a residential gateway element or function.

In addition, according to embodiments, there is provided, for example, a computer program product for a computer, including software code portions for performing the steps of the above defined methods, when said product is run on the computer. The computer program product may include a computer-readable medium on which said software code portions are stored. Furthermore, the computer program product may be directly loadable into the internal memory of the computer and/or transmittable via a network by means of at least one of upload, download and push procedures.

BRIEF DESCRIPTION OF THE DRAWINGS

Some embodiments of the present invention are described below, by way of example only, with reference to the accompanying drawings, in which.

DESCRIPTION OF EMBODIMENTS

Figure 1:
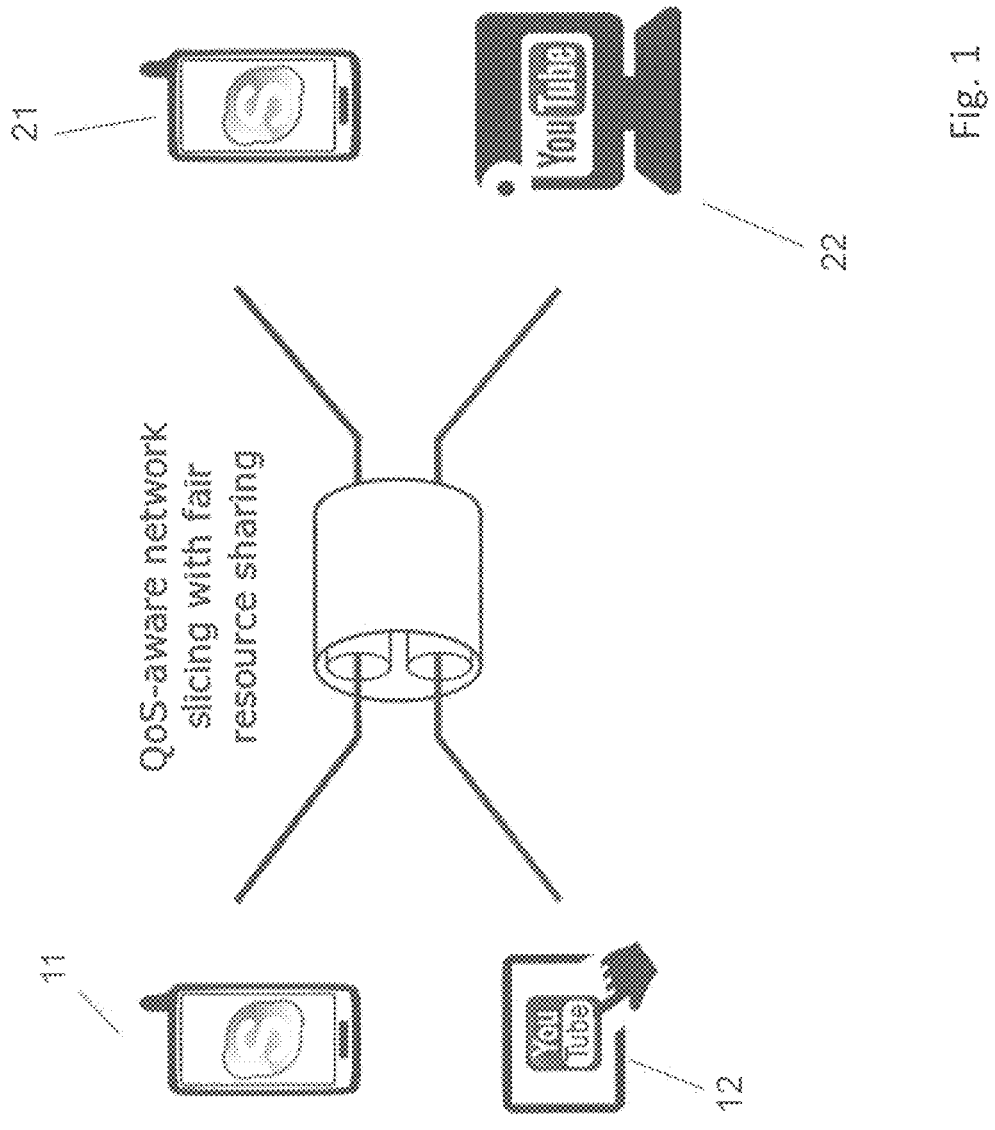
FIG. 1 shows a diagram illustrating a data transmission concept according to some examples of embodiments.

In the last years, an increasing extension of communication networks, e.g. of wire based communication networks, such as the Integrated Services Digital Network (ISDN), DSL, or wireless communication networks, such as the cdma2000 (code division multiple access) system, cellular 3rd generation (3G) like the Universal Mobile Telecommunications System (UMTS), fourth generation (4G) communication networks or enhanced communication networks based e.g. on LTE or LTE-A, fifth generation (5G) communication networks, cellular 2nd generation (2G) communication networks like the Global System for Mobile communications (GSM), the General Packet Radio System (GPRS), the Enhanced Data Rates for Global Evolution (EDGE), or other wireless communication system, such as the Wireless Local Area Network 5 (WLAN), Bluetooth or Worldwide Interoperability for Microwave Access (WiMAX), took place all over the world. Various organizations, such as the European Telecommunications Standards Institute (ETSI), the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMAX Forum and the like are working on standards or specifications for telecommunication network and access environments.

Generally, for properly establishing and handling a communication between two or more end points (e.g. communication stations or elements, such as terminal devices, user equipments (UEs), or other communication network elements, a database, a server, host etc.), one or more network elements such as communication network control elements, for example access network elements like access points, radio base stations, relay stations, eNBs, gNBs etc., and core network elements or functions, for example control nodes, support nodes, service nodes, gateways etc., may be involved, which may belong to one communication network system or different communication network systems.

Next-generation (also referred to as 5G) networks will provide significant improvements for achieving a fully mobile and connected society. A variety of new use cases and business models is under discussion as being available for customers. However, for providing sufficient capabilities in the communication networks to allow this, it is necessary to rethink the structure of communication networks and in particular mobile networks to support very diverse and extreme requirements for e.g. latency, throughput, capacity, and availability.

One approach to reach this in general is a shift from the current network of entities architecture to a network of capabilities architecture, and to shift network models from the current network for connectivity model to a network for services model.

In order to achieve this, a concept called network slicing is employed. Network slicing describes basically to create and use multiple logical (or virtual) networks on top of a common shared physical infrastructure. This offers an effective way to meet the requirements of all use cases by using a common network infrastructure, wherein measures for designing, deploying, customizing, and optimizing different network slices on a common infrastructure are required.

In previous communication networks, mainly a so-called best-effort networking is executed. On the other hand, for the next generation 5G networks, QoS support is widely recognized as a key differentiator, wherein bandwidth and latency control represent key prerequisites.

In general, two types of transport protocols—capacity-oriented and latency-oriented protocols—can be used to deliver QoS-constraint flows. However, protocols in different categories have generally antagonistic needs in terms of network resource allocation, and their mutual competition often leads to substantial performance degradation of at least one of them, typically the latency-constraint one.

Figure 12:
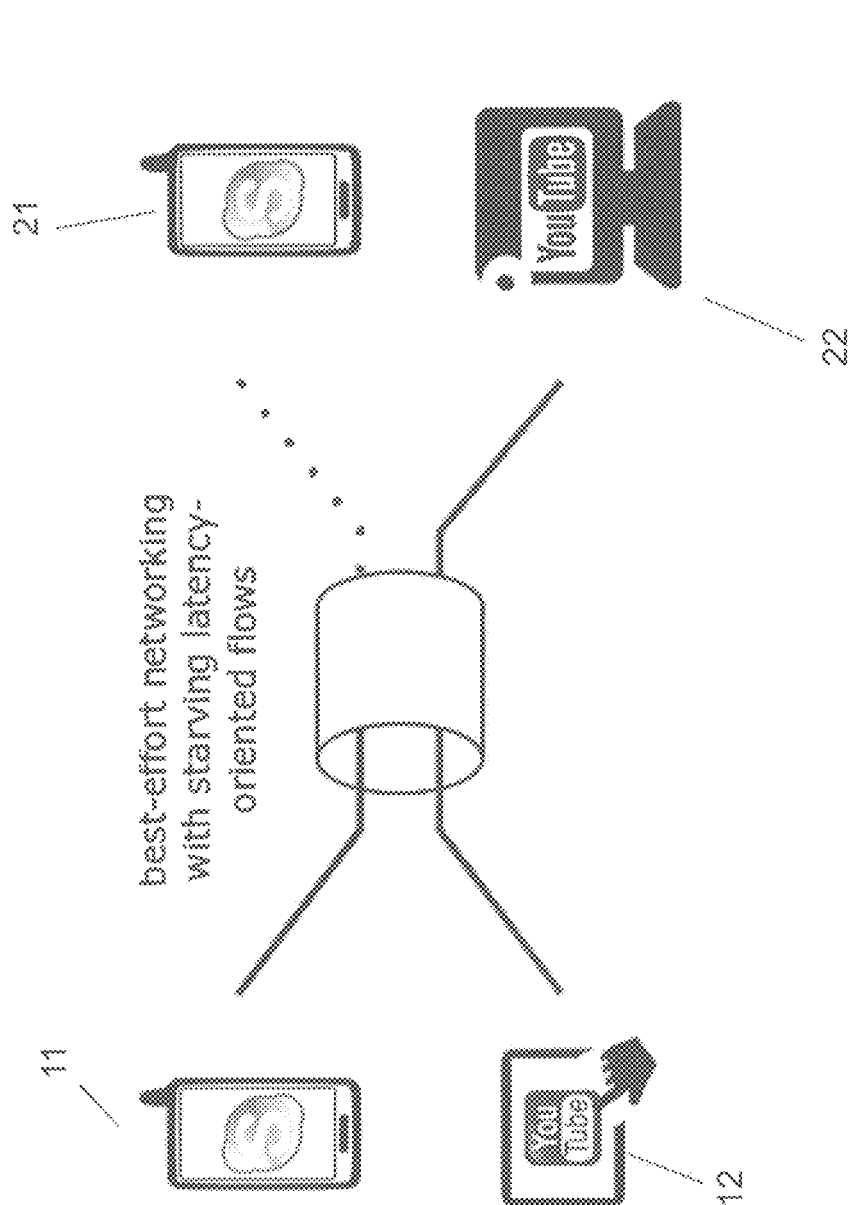
FIG. 12 shows a diagram illustrating a conventional data transmission concept.
Figure 12:
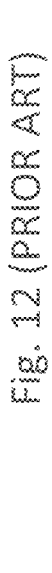

FIG. 12 shows a diagram illustrating a conventional data transmission concept. According to FIG. 12, a situation is assumed where two different data flows are to be transmitted via a common communication network with shared data queuing. Specifically, a latency-oriented data flow between two communication elements such as UEs 11 and 21 is to be transmitted (for example, data flows related to a Skype session between UEs 11 and 21), while at the same time a capacity-oriented data flow between a communication element such as a UE or tablet 12 and a server 22 is to be transmitted (for example, data flows related to a Youtube session between UE 12 and server 21).

Generally, the capacity-oriented data flows (e.g. Youtube video buffering and bulk transfers based on TCP Cubic common in Linux) are designed to aggressively fill data buffers of intermediate nodes along the data delivery path, such as routers, access points, base station etc. By creating as long buffer queues as possible, these flows can then maximize the usage of wireless/wireline channels because data is always ready for transmission, especially when peak performance conditions occur.

However, such a transmission strategy may negatively impact other protocol types such as latency-aware protocols (e.g. Skype sessions, interactive Webex video calls over UDP or Youtube streaming over TCP Vegas and Microsoft TCP Compound). Such latency-aware protocols rely on an antagonistic strategy of maintaining minimal buffer queues to ensure timely data delivery (for example, the buffer queue duration in LTE base stations can reach up to units of seconds whereas human interactivity deadline is typically 100 ms).

As a result, capacity-oriented TCP flows may reduce the latency-constraint throughput of latency-aware TCP flows to very low values, often to zero. This is indicated in FIG. 12 by the dotted line at the right exit of the communication network which indicates the starving latency-oriented flows.

In other words, when data flows of any type are delivered in a best effort manner over shared links (such as mobile communication network links like LTE and Wifi), it may occur that latency control become very difficult or essentially impossible since concurrent capacity-oriented flows can reduce the goodput of latency-oriented protocols to arbitrarily low values. For example, a situation can occur where queues, such as LTE queues, last for a long time (even units of seconds are possible) while their presence inhibits any interactive streaming. There are approaches like medium access prioritization based on IP header 5-tuple (used, for example, in the LTE QCI framework and Wifi DiffServ framework), which are not able to fundamentally solve this transport-layer problem.

Thus, according to examples of embodiments of the invention, a new network slicing framework for the control and optimization of data flow traffic characterized by pre-defined quality-of-service (QoS) requirements is provided which allows to deal with problems like that described above, in particular in connection with future network structures like 5G networks. Specifically, according to examples of embodiments, a control procedure for transmitting data flows by using network slices is provided which supports explicitly QoS, i.e. ensures the co-existence of data flows with various QoS constraints, wherein changes in network infrastructures are avoided. That is, examples of embodiments of the invention are related to a network slicing framework that allows delivering data flows to/from an unmodified communication elements (such as a legacy handset) while flow-specific QoS constraints (imposed, for example, by a user, an operator or an application involved in the data flow transmission) can be satisfied.

In the following, different exemplifying embodiments will be described using, as an example of a communication network to which the embodiments may be applied, a communication network architecture based on 3GPP standards, such as 5G communication networks, without restricting the embodiments 5 to such architectures, however. It is obvious for a person skilled in the art that the embodiments may also be applied to other kinds of communication networks having suitable means by adjusting parameters and procedures appropriately, e.g. 4G networks, WiFi, worldwide interoperability for microwave access (WiMAX), Bluetooth®, personal communications services (PCS), ZigBee®, wideband code division multiple access (WCDMA), systems using ultra-wideband (UWB) technology, mobile ad-hoc networks (MANETs), wired access, etc. Furthermore, without loss of generality, the description of some examples of embodiments is related to a mobile communication network, but principles of the invention can be extended and applied to any other type of communication network, such as a wired communication network.

The following examples and embodiments are to be understood only as illustrative examples. Although the specification may refer to "an", "one", or "some" example(s) or embodiment(s) in several locations, this does not necessarily mean that each such reference is related to the same example(s) or embodiment(s), or that the feature only applies to a single example or embodiment. Single features of different embodiments may also be combined to provide other embodiments. Furthermore, terms like "comprising" and "including" should be understood as not limiting the described embodiments to consist of only those features that have been mentioned; such examples and embodiments may also contain features, structures, units, modules etc. that have not been specifically mentioned.

A basic system architecture of a (tele)communication network including a mobile communication system where some examples of embodiments are applicable may include an architecture of one or more communication networks including wireless access network subsystem(s) and core network(s). Such an architecture may include one or more communication network control elements, access network elements, radio access network elements, access service network gateways or base transceiver stations, such as a base station (BS), an access point (AP), a NodeB (NB), an eNB or a gNB, a distributed or a centralized unit, which control a respective coverage area or cell(s) and with which one or more communication stations such as communication elements, user devices or terminal devices, like a UE, or another device having a similar function, such as a modem chipset, a chip, a module etc., which can also be part of a station, an element, a function or an application capable of conducting a communication, such as a UE, an element or function usable in a machine-to-machine communication architecture, or attached as a separate element to such an element, function or application capable of conducting a communication, or the like, are capable to communicate via one or more channels for transmitting several types of data in a plurality of access domains. Furthermore, core network elements such as gateway network elements, mobility management entities, a mobile switching center, servers, databases and the like may be included.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from an element, function or application, like a communication endpoint, a communication network control element, such as a server, a gateway, a radio network controller, and other elements of the same or other communication networks besides those described in detail herein below.

A communication network as being considered in examples of embodiments may also be able to communicate with other networks, such as a public switched telephone network or the Internet. The communication network may also be able to support the usage of cloud services for virtual network elements or functions thereof, wherein it is to be noted that the virtual network part of the telecommunication network can also be provided by non-cloud resources, e.g. an internal network or the like. It should be appreciated that network elements of an access system, of a core network etc., and/or respective functionalities may be implemented by using any node, host, server, access node or entity etc. being suitable for such a usage.

Furthermore, a network element, such as communication elements, like a UE, a terminal device, control elements or functions, such as access network elements, like a base station (BS), an gNB, a radio network controller, a gateway element, other network elements as well as corresponding functions as described herein, and other elements, functions or applications may be implemented by software, e.g. by a computer program product for a computer, and/or by hardware. For executing their respective functions, correspondingly used devices, nodes, functions or network elements may include several means, modules, units, components, etc. (not shown) which are required for control, processing and/or communication/signaling functionality. Such means, modules, units and components may include, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CDROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means including e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

It should be appreciated that according to some examples, a so-called "liquid" or flexible network concept may be employed where the operations and functionalities of a network element, a network function, or of another entity of the network, may be performed in different entities or functions, such as in a node, host or server, in a flexible manner. In other words, a "division of labor" between involved network elements, functions or entities may vary case by case.

In the following description of examples of embodiments, reference is made to so-called service slices or network slices which accommodate flows with specific QoS constraints, for example a particular combination of minimum data rate and end-to-end latency. For the network slices according to examples of embodiments, a tailored protocol stack for their delivery subject to the slice-specific QoS constraints is used, which represents a flow encapsulation. In addition to such a flow encapsulation, service or network slices according to examples of embodiments of the invention are also able to ensure flow isolation; that is, flows belonging to different QoS slices cannot interact, i.e. mutually degrade their performance. That is, a protected delivery of the data flows is established allowing to ensure fundamental QoS feasibility.

FIG. 1 shows a diagram illustrating a data transmission concept according to examples of embodiments of the present invention. In order to show the basic concept of the invention, a situation similar to that of FIG. 12 is depicted. That is, a situation is assumed where two different data flows, i.e. a latency-oriented data flow between two communication UE 11 and UE 21 (for example, data flows related to a Skype session between UEs 11 and 21) and a capacity-oriented data flow between UE 12 and server 22 (for example, data flows related to a Youtube session between UE 12 and server 21) are transmitted. By means of the transmission control procedure according to examples of embodiments of the invention, a network slicing is performed where QoS-aware encapsulation and protected delivery of the selected data flows is established. This ensures seamless delivery of both the capacity-oriented data flows (e.g. Youtube) and the latency-oriented data flows (e.g. Skype), which are subject to user/operator/application-defined QoS constraints, as indicated by the continuous connections between the respective communication end points.

Figure 2:
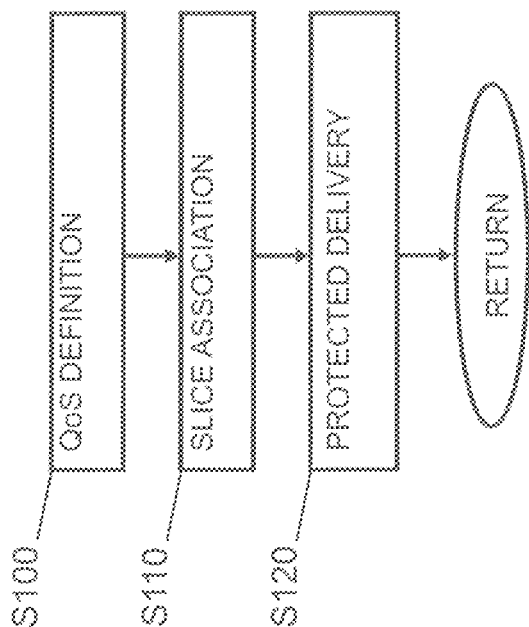
FIG. 2 shows a flow chart of a processing for controlling a data transmission by using network slices according to some examples of embodiments.

According to examples of embodiments of the invention, in order to achieve this, network slices are defined, created and operated in several steps as specified in connection with FIG. 2. Specifically, FIG. 2 shows a flow chart of a processing for controlling a data transmission by using network slices according to some examples of embodiments;

In S100, a QoS setting is defined for at least one data flow to be transmitted in the communication network. For example, in S100, QoS targets of an application data flow (e.g. the data flows indicated in FIG. 1) are defined based on specific requirements, for example requirements of a network operator, of a user, of an application, or of a communication element involved (e.g. the handset device of the user).

In S110, at least one network slice is associated to the at least one data flow to be transmitted. The at least one network slice consists of one or more data transport services using communication resources of the communication network. In this connection, means for generating the data flow packets are implemented.

In S120, a protected delivery of the at least one data flow by using the associated network slice is caused. That is, the generated data flows 5 are delivered in a controlled manner over the slice-specific network resources, wherein the term protected means that there is no interaction between the different network slices, for example. According to examples of embodiments, backward compatible orthogonalization of slice resources is used at one or more layers of the network protocol stack to control (undesirable) flow/slice interactions.

Figure 3:
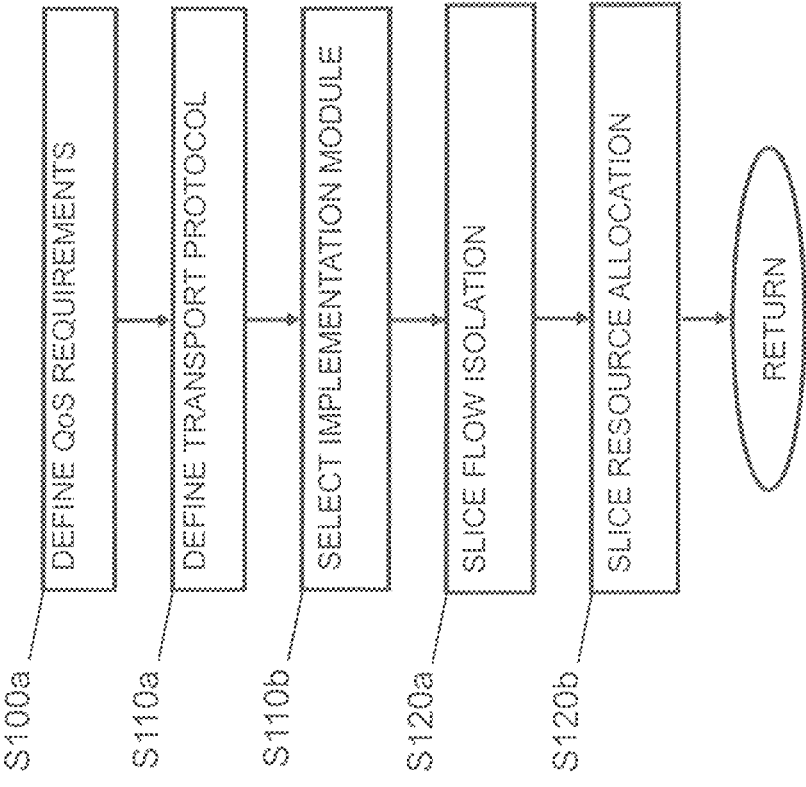
FIG. 3 shows a flow chart of a processing for controlling a data transmission by using network slices according to some examples of embodiments.

FIG. 3 shows a flow chart of a processing for controlling a data transmission by using network slices according to some examples of embodiments. Specifically, FIG. 3 shows a more detailed processing for controlling the data transmission based on the processing of FIG. 2 where network slices are defined, created and operated in several steps.

In S100a, which is related to the QoS definition, the QoS setting for the at least one data flow to be transmitted in the communication network includes a setting of a minimum QoS. This is based, as indicated above, on one or more of the following: requirements of an operator of the communication network, requirements indicated by a user involved in a communication including the transmission of the at least one data flow, requirements indicated by profile settings of an application involved in a communication including the transmission of the at least one data flow, and requirements indicated by configuration data of a network element or function involved in a communication including the transmission of the at least one data flow.

For example, the minimum QoS is set for an application involved in the communication (in which the transmission of the at least one data flow is included), for example for a selected application of a premium user, by using at least one of a default application profile (for example a latency definition and/or bandwidth definition stored in the UE or the like), a dynamic operator policy (for example a radio access policy specified by operator management entities), and an on-demand user command (for example a direct input of the user transmitted via a suitable interface at the user's UE).

Next, in S110a, which is related to the slice association processing of S100 in FIG. 2, in order to associate the at least one network slice to the at least one data flow to be transmitted, a transport protocol belonging to the at least one network slice is defined. As indicated above, data transport services of certain type and/or configuration form the network slice, and the application data flow is associated with a suitable transport service, consisting of a combination of data convergence, transport, and adaptation functions.

For example, a network slice to be created for the transmission of the at least one data flow can be one of a capacity-oriented network slice which gives priority to the amount of data to be transmitted (for example, a set of non-encapsulating UDP flows and standard/asymmetric TCP flows), and a latency-oriented (or latency-aware) network slice which gives priority to a latency of data transmission (for example a set of UDP flows carrying e.g. a LEAP payload (described later)).

As the transport protocol belonging to the at least one network slice one or more of the following protocols can be selected: a multi-connectivity service for best-effort capacity aggregation (e.g. a standard MTPCP protocol), a multi-connectivity service for QoS aware capacity aggregation (e.g. a proprietary multi-connectivity service for QoS-aware capacity aggregation configured to deliver data within a specific time for at least a certain ratio, such as Nokia LEAP protocol which delivers data within 100 ms at least 95% of the time), and a complementary service for asymmetric data routing (e.g. a proprietary complementary service for asymmetric data routing using different network types, e.g. to route DL traffic over 5G resources and UL traffic over 4G resources to compensate for inconsistent 5G UL coverage, like Nokia BOOST protocol).

In S110b, which is also related to the slice association of S110 in FIG. 2, a suitable module is selected to implement the generation of data flow packets. That is, in S110b, a network module for implementing the generation of data flow packets to be transmitted in the at least one associated network slice is selected.

According to examples of embodiments of the invention, the selected network module for implementing the generation of data flow packets is provided by a kernel-space service of at least one network element or function involved in a communication including the transmission of the at least one data flow, or by a user-space function implemented and running in at least one network element or function involved in a communication including the transmission of the at least one data flow. Alternatively, also both network modules can be involved, i.e. a kernel-space service of at least one network element or function involved in a communication including the transmission of the at least one data flow and a user-space function implemented and running in the at least one network element or function involved in the communication including the transmission of the at least one data flow.

That is, according to examples of embodiments of the invention, the slice association is done by (re)-directing application system calls for networking services to the kernelspace services (e.g. of an MPTCP-capable device) to implement standardized functionality (e.g., MPTCP protocol). On the other hand, user-space functions can be used for advanced proprietary features (such as Nokia LEAP and BOOST protocols).

Next, in S120a, which is related to the protected delivery of S120 of FIG. 2, the protected delivery of the at least one data flow by using the associated network slice is effected by isolating slice flows for transmitting the data flow via mutually exclusive resources of the communication network. As indicated above, the data flows are delivered in a controlled manner over slice-specific network resources, wherein backward-compatible orthogonalization of the slice resources is primarily used at one or more layers of the network protocol stack to control (undesirable) flow/slice interactions. That is, slice flows for transmitting the data flow are isolated, for example, on one of a physical layer (layer 1 of the protocol stack), a data link layer (layer 2 of the protocol stack), a network layer (layer 3 of the protocol stack) and a transport layer (layer 4 of the protocol stack).

For example, the slice flows for transmitting the data flow are isolated on the physical layer by using different access technologies for respective slice flows. On the data link layer, the slice flows for transmitting the data flow are isolated by generating connections to different VLANs for respective slice flows, for example. On the network layer, the slice flows for transmitting the data flow are isolated by providing different paths to gateways for respective slice flows. On the transport layer, the slice flows for transmitting the data flow are isolated by controlling a data rate for data transmission by setting at least one state variable of the transport layer to a specified value (e.g. CWND, RWND). That is, according to examples of embodiments, the slice flows for transmitting the data flow can be isolated, for example, on the data link layer and the network layer, by multiplexing at least one of virtual access devices, delivery tunnels and subnetworks, and on the transport layer, by controlling at least one of CWND and advertised RWND. It is to be noted that on-demand virtual networks dimensioning is driven, for example, by traffic volume.

Then, in S120b, which is also related to the protected delivery of S120 in FIG. 2, resources of the communication network are allocated to the at least one network slice for transmitting the data flow. For example, the resources of the communication networks are dynamically to the isolated slice flows in accordance with traffic requirements for the delivery of the data flow (i.e. physical resources required for achieving the bandwidth etc. indicated in the minimum QoS are allocated to the network slices).

In the following, examples of implementing the data transmission control procedures according to examples of embodiments of the invention will be described. For illustrating these examples, two types of multi-connectivity network configurations are used whose general structures are introduced by means of FIGS. 4A/B and 5A/B.

Figure 4A:
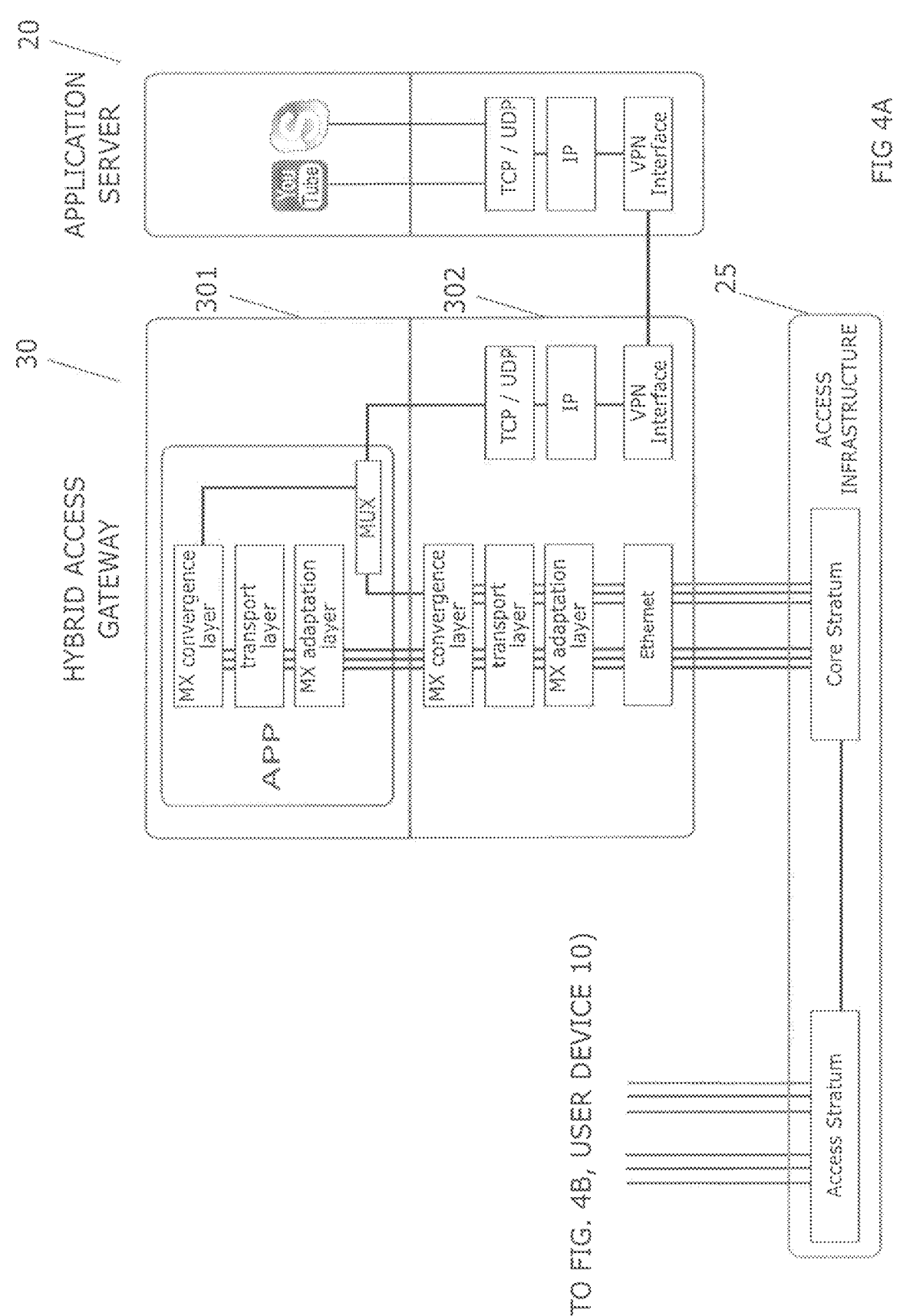
FIGS. 4A and 4B show a combined diagram illustrating an example of a network configuration where a multi-connectivity communication according to some examples of embodiments is possible.
Figure 4B:

Specifically, FIGS. 4A and 4B show a diagram illustrating an example of a multiconnectivity network configuration where examples of embodiments of the invention can be implemented. In the example shown in FIGS. 4A/B, a 5G UE-based multi-connectivity architecture is shown in which multi-path communications are enabled by proxies deployed in a UE and the operator network.

Figure 5A:
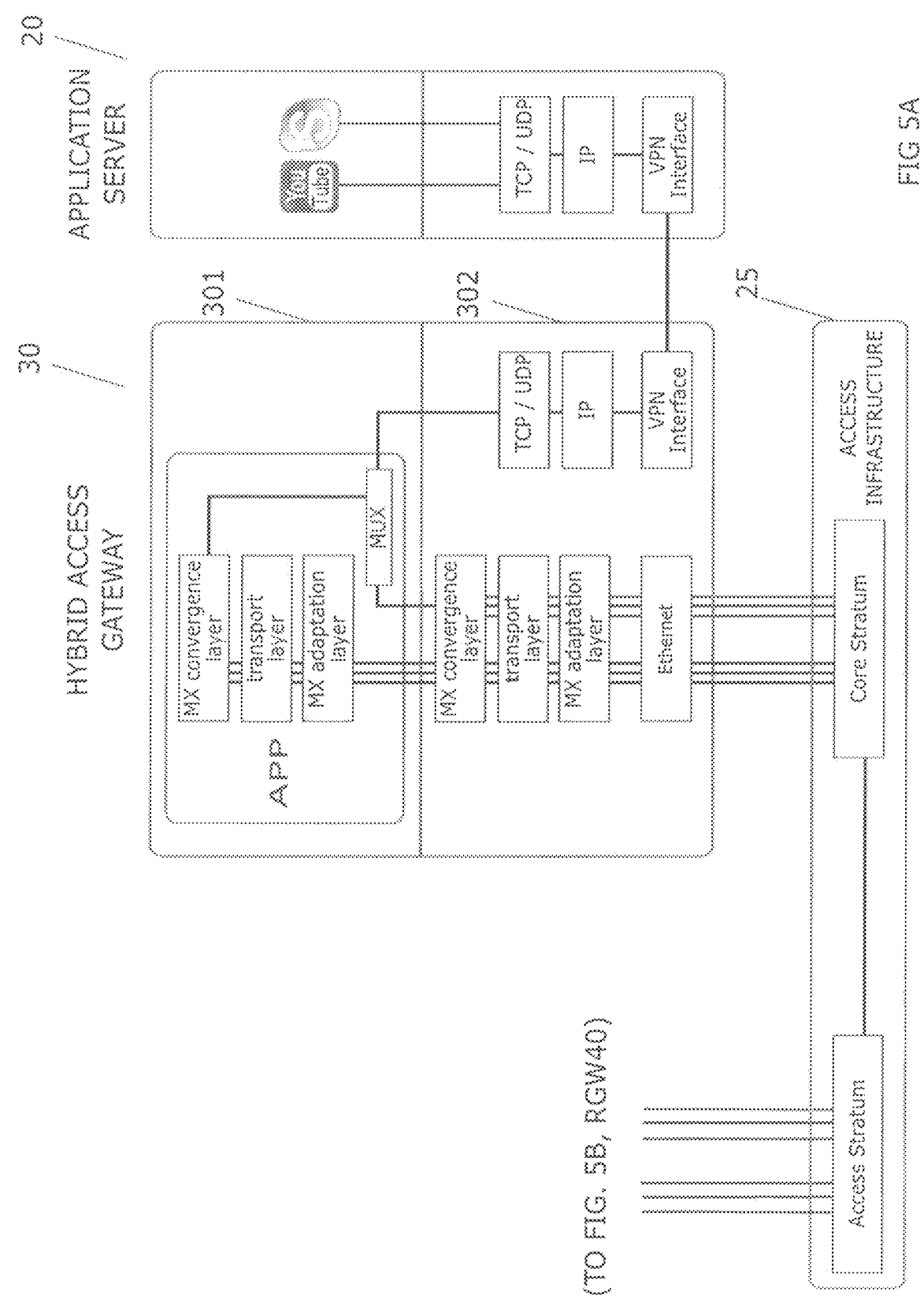
FIGS. 5A and 5B show a combined diagram illustrating a further example of a network configuration where a multi-connectivity communication according to some examples of embodiments is possible.
Figure 5B:
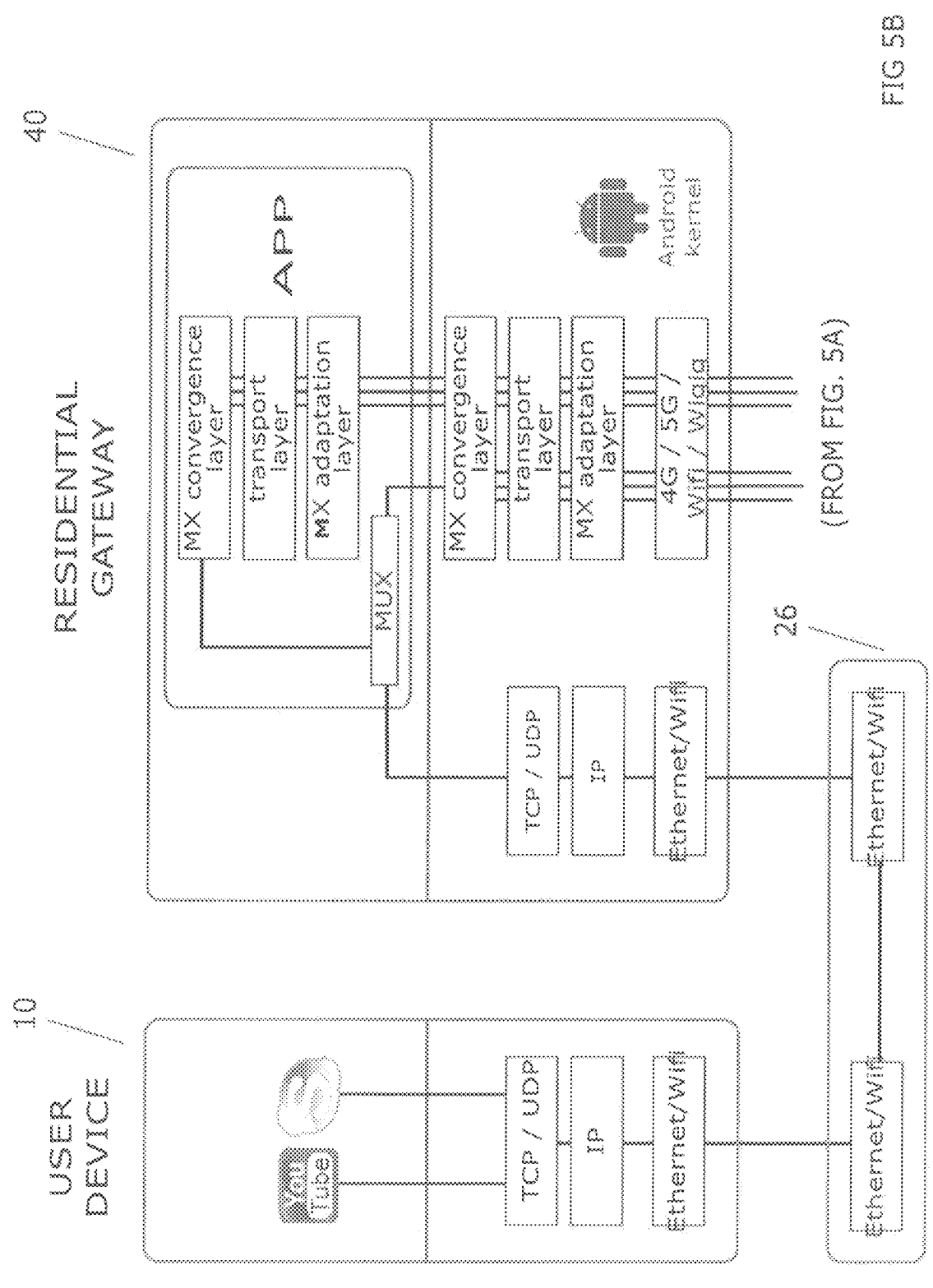

On the other hand, FIGS. 5A and 5B show a diagram illustrating another example of a multi-connectivity network configuration where examples of embodiments of the invention can be implemented. In the example shown in FIGS. 5A/B, a 5G RGW-based multi-connectivity architecture is shown where multi-path communications are enabled by proxies deployed in a residential gateway (RGW, also referred to as a customer premise equipment) and in the operator network.

It is to be noted that the architectures shown in FIGS. 4A/B and 5A/B are only two examples of a plurality of possible architectures where the concepts and principals of embodiments of the invention are applicable. Also other architecture types can be used, such as an architecture where a UE (or an RGW) are directly connected to an application server, or where a plurality of other network elements or functions, such as other gateways, are interposed in the communication paths.

With reference to FIG. 4A/B, in the 5G UE-based multi-connectivity architecture, a UE 10 is connected via an access infrastructure 25 (i.e. by means 5 of an access stratum and a core stratum included in the access infrastructure 25) to a gateway element or function (here a HAG 30) and then to an application server 20. Reference sign 101 denotes a user-space module of the operating system of UE 10 (in the example of FIGS. 4A/B, an Android based OS), while reference sign 102 denotes a kernel-space module of the UE 10 operating system. Similarly, the HAG 30 comprises a user-space module 301 and a kernel-space module 302. For illustrative purposes, as data flow examples, capacity-oriented data flows like Youtube and latency-aware data flows like Skype are indicated as data flows to be transmitted.

When adopting a DL perspective, a data flow is sent from the application content server to the hybrid access gateway (HAG) 30 which then forwards the data flow over one or multiple parallel links towards the UE 10. According to the example shown in FIGS. 4A/B, data subflows are delivered directly to the UE 10, for example via LTE or Wifi links. The data subflows are aggregated in the UE 10. That is, flow re-assembly can occur in the kernel space 101 of the UE operating system and/or in the user-space module 102 of the UE operating system.

In the example shown in FIGS. 4A/B, in accordance with, for example, MAMS specifications, the re-assembly architecture is structured into a multi-access (MX) convergence layer, transport layer and multi-access (MX) adaptation layer (both in the user space module and the kernel space module). The MX convergence layer performs multi-access specific tasks, such as access (path) selection, multi-link (path) aggregation, splitting/reordering, lossless switching, fragmentation, concatenation, keep-alive, and probing etc. The transport layer performs basic data payload encapsulation. Furthermore, the MX adaptation layer performs functions to handle asymmetric routing, tunneling, network layer security, and NAT etc.

According to the example shown in FIGS. 4A/B, the UE OS comprises a multi-connectivity capable kernel as well as a multi-connectivity capable user-space module (i.e. a standard application). The kernel functions 102 provide basic standardized features (e.g. MPTCP multi-connectivity for TCP-based applications) whereas the user-space module 101 enables advanced proprietary multi-connectivity features (e.g. an application module for multi-path UDP support, MPTCP with asymmetric routing, or a proprietary protocol such as Nokia LEAP protocol for explicit latency control subject to pre-defined data delivery deadlines).

The user-space module 101 can be provided, for example, from a manufacturer of the UE 10 or can be pre-installed by the network operator in the UE 10, or can be downloaded from an external source like an App Store and installed by the user. It is to be noted that the module 101 can use a standard framework for virtual private networks (VPN) to redirect all uplink (UL) application data flows based on single-path TCP or UDP via a virtual interface into a flow multiplexer (MUX). The multiplexer can be implemented on basis of the Layer Two Tunneling Protocol (L2TP).

The redirection of application data to the user space module 101 can be alternatively implemented also by intercepting applications system calls for kernel networking services. To this end, one can either modify the application code after its activation (applications are loaded by so-called LD preload module that links to modified C library for SOCKET calls), or modify the application execution environment in user space (system call hooks are injected e.g. into Android Dalvik/ART Virtual Machine by using the so-called Xposed framework or a similar JAVA method hooking mechanism).

After TCP/UDP payload extraction, the user-space MUX in the user space module 101 forwards the UL data to the application content server 20 by using kernel-space networking stack (via a dedicated Application Programming Interface (API)) and/or userspace networking stack. As shown in FIGS. 4A/B, both types of networking stack consist of three layers—multi-path (MX) convergence layer, transport layer, and MX adaptation layer. If the MX convergence layer is activated, multiple radio access technologies are used in parallel to form concurrent data delivery links, e.g. over LTE and Wifi.

According to examples of embodiments, the user-space module can configure existing kernel protocols (e.g. MPTCP), modify existing kernel protocols (e.g. loading a tailored congestion control module from the LTE SIM card), and implement new networking protocol stacks within the injected code base (e.g. proprietary protocol like Nokia LEAP and BOOST).

With reference to FIGS. 4A/B, in the 5G UE-based multi-connectivity architecture, a UE 10 is connected via an access infrastructure 25 (i.e. by means of an access stratum and a core stratum included in the access infrastructure 25) to a gateway element or function 30 (here a HAG 30) and then to an application server 5 20. Reference sign 101 denotes a user-space module of the operating system of UE 10 (in the example of FIGS. 4A/B, an Android based OS), while reference sign 102 denotes a kernel-space module of the UE operating system. Similarly, the HAG 30 comprises a user-space module 301 and a kernel-space module 302. For illustrative purposes, as data flow examples, capacity oriented data flows like Youtube and latency-aware data flows like Skype are indicated as data flows to be transmitted.

FIGS. 5A and 5B, on the other hand, shows a 5G RGW-based multi-connectivity architecture in which a UE 10 is connected via an connection like Ethernet or Wifi 26 to an RGW 40, which is connected via an access infrastructure 25 (i.e. by means of an access stratum and a core stratum included in the access infrastructure 25) to a gateway element or function 30 (here a HAG 30) and then to an application server 20. In difference to the architecture shown in FIGS. 4A/B, the architecture of FIGS. 5A/B describes a system where the residential gateway (RGW) 40 receives the multi-path traffic (e.g. over DSL and LTE) and performs seamlessly the flow re-assembly. Then, the RGW 40 forwards the resulting data flow to the UE 10 over a single-technology radio access (26, e.g. Wifi). For this, the RGW 40 comprises a user-space module 141 of the operating system (in the example of FIGS. 5A/B, an Android based OS), and a kernel-space module 142 of the operating system. The HAG 30 and the application server 20 are equivalent to those shown in FIG. 4, wherein again, as data flow examples, capacity-oriented data flows like Youtube and latency-aware data flows like Skype are indicated as data flows to be transmitted.

Consequently, in the architecture of FIGS. 5A/B, when adopting a DL perspective, a data flow is sent from the application content server 20 to the hybrid access gateway (HAG) 30 which then forwards the data flow over one or multiple parallel links towards the RGW 40. According to the example shown in FIGS. 5A/B, data subflows are delivered to the RGW 40 which performs the flow reassembly and then delvers a resulting data flow to the UE 10, for example via Wifi links. That is, flow re-assembly can occur in the kernel space 142 of the RGW operating system and/or in the user-space module 141 of the RGW operating system.

Also in the example shown in FIGS. 5A/B, in accordance with, for example, MAMS specifications, the re-assembly architecture is structured 5 into a multi-access (MX) convergence layer, transport layer and multi-access (MX) adaptation layer (both in the user space module and the kernel space module). Furthermore, according to the example shown in FIGS. 5A/B, the RGW OS comprises a multi-connectivity capable kernel 142 as well as a multi-connectivity capable user-space module 141 (i.e. a standard application). The kernel functions 141 provide basic standardized features (e.g. MPTCP multi-connectivity for TCP-based applications) whereas the user-space module 141 enables advanced proprietary multi-connectivity features (e.g. an application module for multi-path UDP support, MPTCP with asymmetric routing, or a proprietary protocol such as Nokia LEAP protocol for explicit latency control subject to pre-defined data delivery deadlines).

The RGW user-space module 141 can be provided, for example, from a manufacturer of the RGW 40 or can be pre-installed by the network operator in the RGW 40, or can be downloaded from an external source like an App Store and installed by the user. It is to be noted that the user space module can use a standard framework for virtual private networks (VPN) to redirect all uplink (UL) application data flows based on single-path TCP or UDP via a virtual interface into a flow multiplexer (MUX). The multiplexer can be implemented on basis of the Layer Two Tunneling Protocol (L2TP).

After TCP/UDP payload extraction, the user-space MUX in the RGW user space module 141 forwards the UL data to the application content server 20 by using kernel-space networking stack and/or user-space networking stack. As shown in FIGS. 5A/B, both types of networking stack consist of three layers—multi-path (MX) convergence layer, transport layer, and MX adaptation layer. If the MX convergence layer is activated, multiple radio access technologies are used in parallel to form concurrent data delivery links, e.g. over DSL and Wifi.

According to examples of embodiments, the user-space module 141 can configure existing kernel protocols (e.g. MPTCP), modify existing kernel protocols (e.g. loading a tailored congestion control module from the LTE SIM card), and implement new networking protocol stacks within the injected code base (e.g. proprietary protocol like Nokia LEAP and BOOST).

In the following, examples of implementing the transmission control procedure as described in connection with FIGS. 2 and 3 in a multi-connectivity network architecture, such as one shown in FIG. 4A/B or 5A/B, in order to enforce pre-defined QoS are explained.

Referring back to the transmission control procedure shown in FIGS. 2 and 3, as a first measure in the network slicing processing according to examples of embodiments of the invention, the QoS targets of an application data flow to be transmitted in the network slice are defined.

In the following examples, it is assumed that corresponding QoS requirements for each flow are defined, for example, as basic service requirements (e.g. maximum latency and/or minimum bandwidth) being stored in a default application profile, or generated dynamically based on operator radio access policy (e.g. preference of home Wifi for data delivery if in range), or by using an on-demand definition input by an application user via an interface at the UE, for example (e.g. a handset interface for indicating whether the application operation is satisfactory (e.g. "avoid frozen screens by reducing resolution").

Figure 6A:
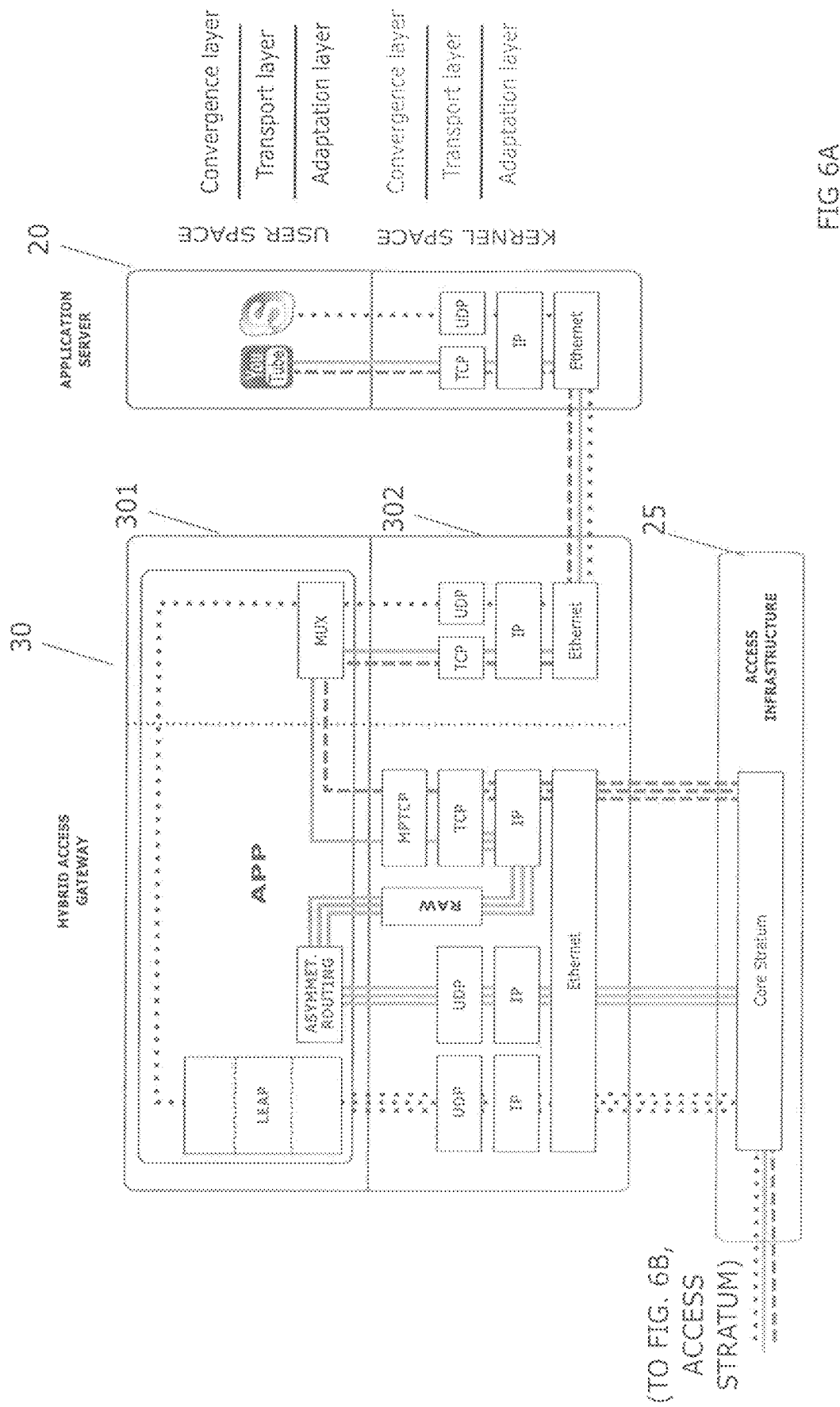
FIGS. 6A and 6B illustrate, in a combined diagram, 5 an implementation of a data transmission control procedure according to some examples of embodiments in the network configuration example of FIGS. 4A/B.
Figure 6B:
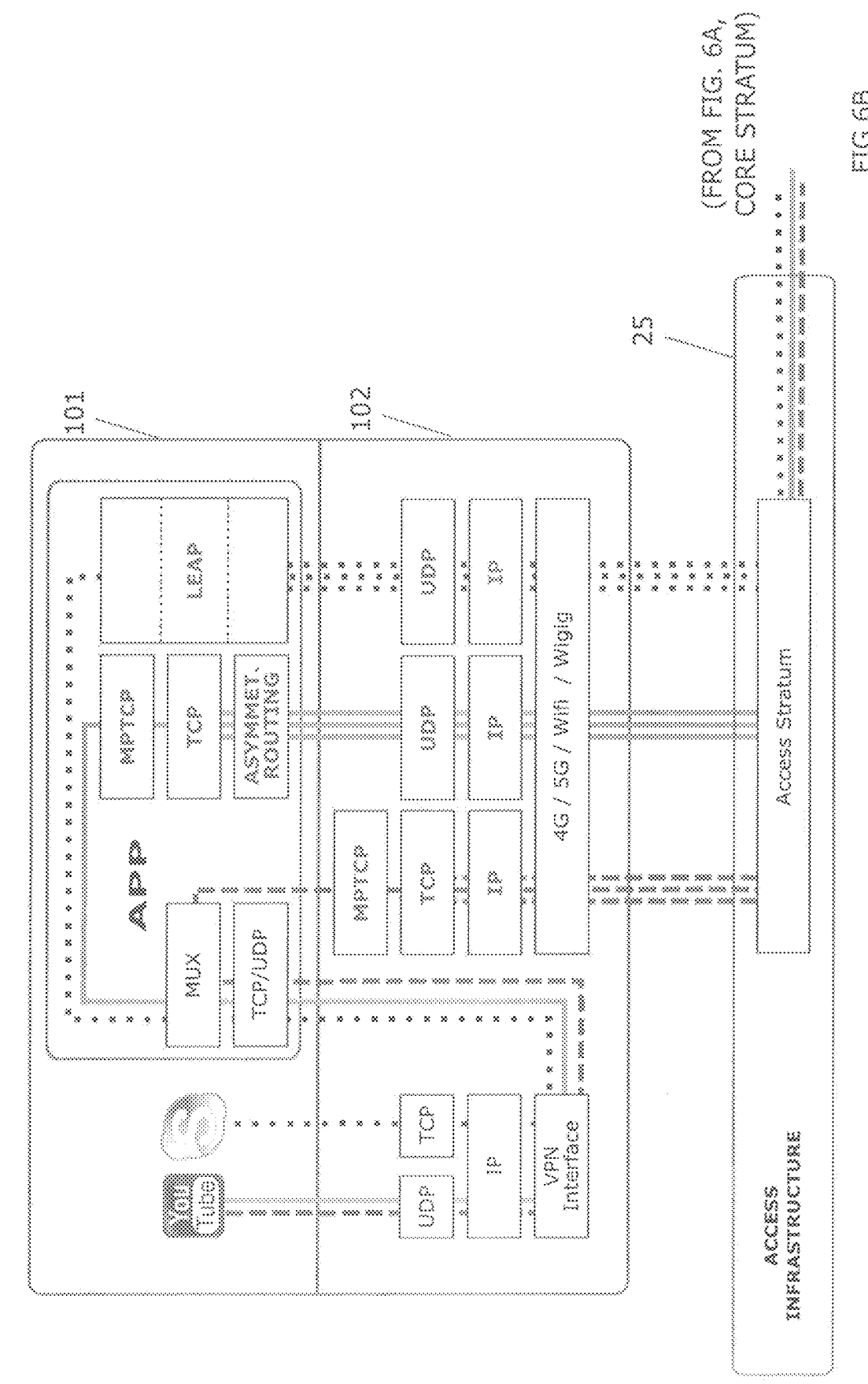
Figure 7A:
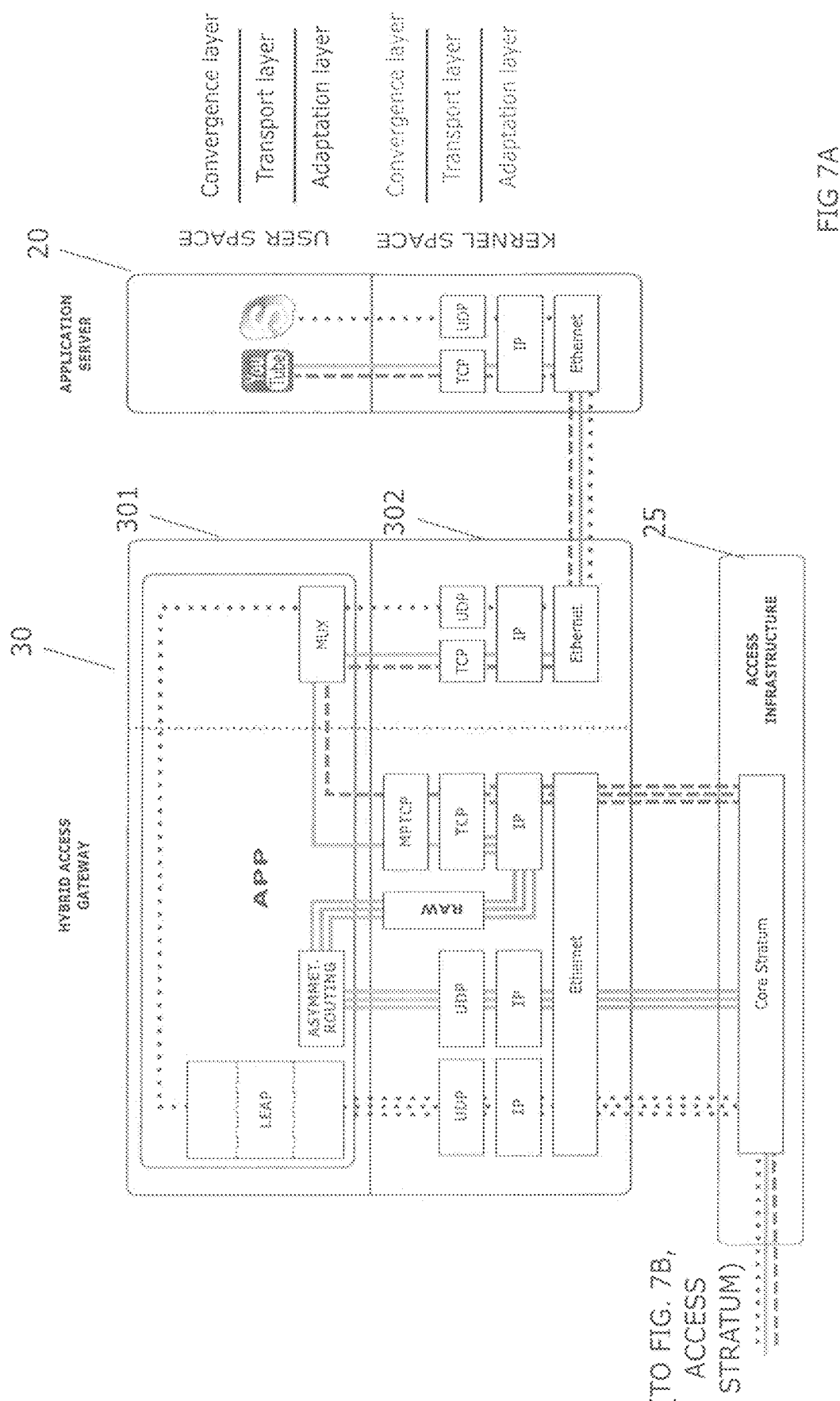
FIGS. 7A and 7B illustrate, in a combined diagram, an implementation of a data transmission control procedure according to some examples of embodiments in the network configuration example of FIGS. 5A/B.
Figure 7B:
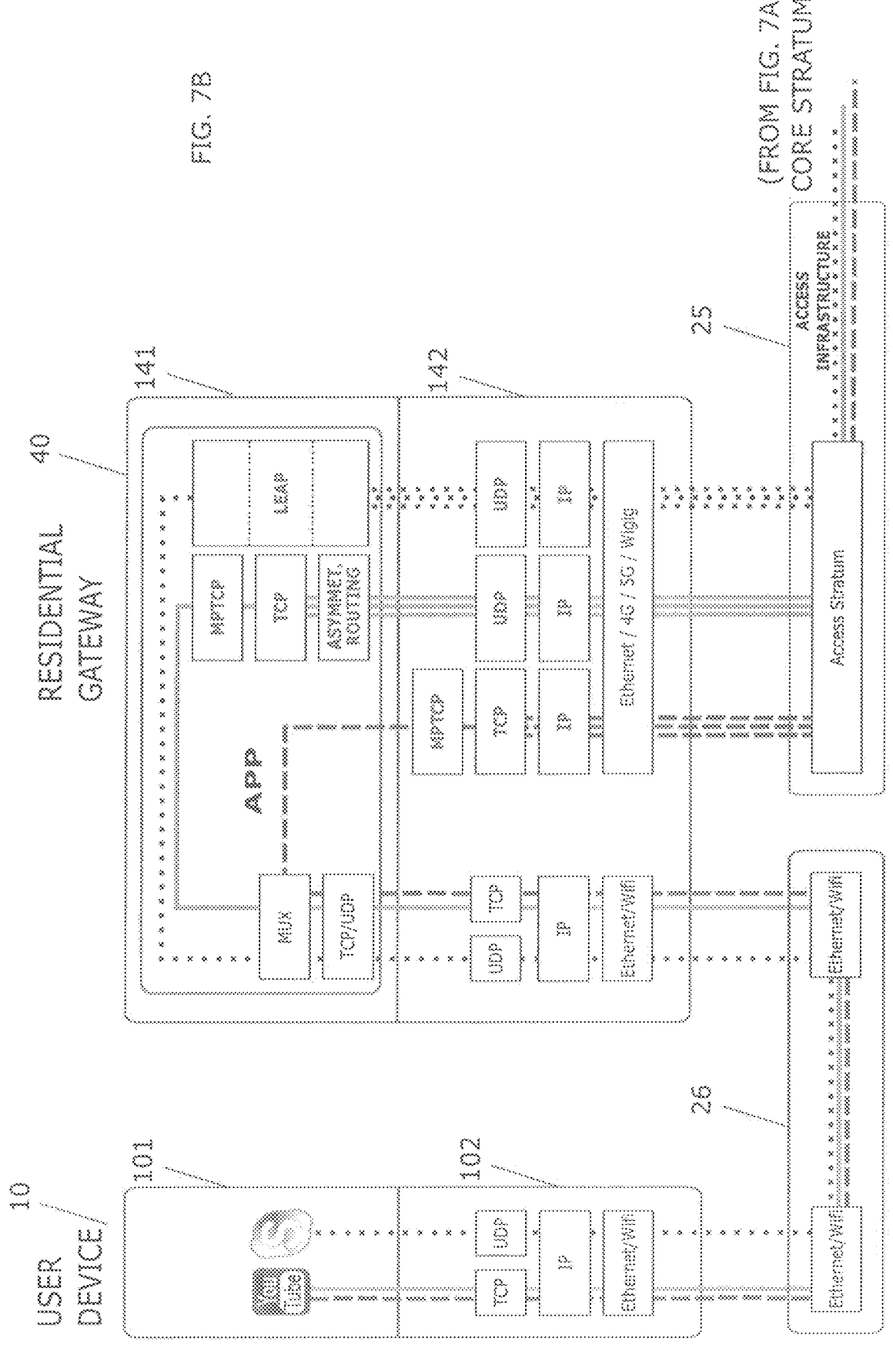

As the next phase, as indicated in the flows of FIGS. 2 and 3, the slice association is executed including, for example, a definition of the transport protocol and a selection of an implementation module. FIGS. 6A and 6B illustrates corresponding parts of the implementation of the data transmission control procedure according to some examples of embodiments in the 5G UE-based multi-connectivity architecture network configuration of FIGS. 4A/B, while FIGS. 7A and 7B illustrates corresponding parts of the implementation of the data transmission control procedure according to some examples of embodiments in the 5G RGW-based multi-connectivity architecture of FIGS. 5A/B.

Basically, after defining the QoS requirements, the corresponding parameters are translated into a selection of a suitable transport-layer protocol which on its own belongs to a network slice.

For example, a suitable transport protocol is selected in accordance with the setting of the network slice as capacity-oriented or latency oriented. Specifically, as one example, when data flows to be transmitted require best-effort capacity aggregation (e.g. a buffered Youtube video transfer), a standard IETF MTPCP can be selected as the transport protocol. In terms of the above-mentioned architecture conforming to the Multi-X/MAMS standard, the convergence sublayer implements the multi-path scheduling, the transport layer is based on TCP, and there is only a transparent adaptation layer executing standard symmetric data routing of both downlink (DL) data and uplink (UL) acknowledgements (ACK).

On the other hand, other protocols such as proprietary solutions like LEAP can be used for QoS-aware capacity aggregation with pre-defined latency and reliability constraints (for example, 100 ms data delivery for 95% of the time), which is preferred for latency-oriented data flows used e.g. for Skype communications. Then, multi-path scheduling with forward-error correction is used at the convergence layer, UDP encapsulation and channel forecasting function are used at the transport layer. As for the adaptation layer, advanced asymmetric routing of DL/UL traffic (e.g. multi-path DL communications with data ACKs sent over a single UL path) is flexibly configurable on demand. For example, DL traffic can be asymmetrically routed over 5G links while UL traffic is routed over 4G links, in order to compensate for inconsistent 5G UL coverage, for example. Furthermore, as another option, offloading Wifi TCP ACK to LTE can also be used to improve the Wifi capacity performance.

Hence, the capacity-oriented network slice can be defined as set of non-encapsulating UDP flows and standard/asymmetric TCP flows, while a latency-aware network slice can be defined as a set of all UDP flows carrying LEAP payload.

In the next phase, a suitable implementation module is to be selected for the actual generation of data flow packets to be transmitted.

For example, the protocol multiplexer (MUX) is controlled such that native kernel-space services are used whenever a networking feature is supported. For example, the IETF MPTCP is selected for data flows like non-realtime Youtube traffic. Otherwise, the userspace module is used to support proprietary optimized functions. For example, MPTCP with asymmetric routing over 4G and 5G is activated in case poor 5G UL coverage is detected, or latency-sensitive delivery by using the Nokia LEAP protocol is activated to deliver latency-oriented data flows, such as interactive Skype data within a pre-defined data delivery deadline.

Referring now to FIGS. 6A/B and 7A/B, results 5 of the above described measures for transport protocol definition and implementation module selection are illustrated for three data flows, wherein two data flows thereof are related to capacity-oriented data flows (such as Youtube data flows), which are indicated by dashed lines and solid lines in FIGS. 6A/B and 7A/B, and one data flow thereof is related to a latency-oriented data flow (such as a Skype related data flow), which is indicated by dotted lines.

Specifically, FIGS. 6A/B and 7A/B show a dual kernel/user-space implementation of legacy MTCPC (in kernel space), non-standard MPTCP with asymmetric routing (in user space), and LEAP (in user space) in the UE-based multi-connectivity architecture (FIGS. 6A/B) and the RGW-based multi-connectivity architecture (FIGS. 7A/B).

It is to be noted that for providing interfaces allowing data exchange between user-space and kernel-space modules, raw sockets and virtual interfaces can be used, for example.

As shown in FIGS. 6A/B, when considering the DL direction for the data flows, a dashed line indicates a data flow for e.g. Youtube video transfer (for best-effort capacity aggregation) using (standard) MPTCP function deployed in the OS kernel. That is, the data flow is transmitted from the application running on the application server 20 e.g. via Ethernet link to the HAG 30, where the multiplexer (MUX) is controlled to distribute this data flow to the kernel-space 302 MPTCP function, from where it is forwarded via access infrastructure 25 to the UE 10. Here, the data flow is received and processed in the kernel-space 102 MPTCP function.

The solid line indicates a data flow for e.g. Youtube video transfer using non-standard MPTCP with asymmetric routing in user space. Hence, the data flow is transmitted from the application running on the application server 20 e.g. via Ethernet link to the HAG 30, where the multiplexer (MUX) is controlled to distribute this data flow to the user-space 301 asymmetric routing function, from where it is forwarded via access infrastructure 25 to the UE 10. Here, the data flow is received and processed in the user-space 101 asymmetric routing function.

The dotted line indicates a data flow for e.g. Skype communications using LEAP. The data flow is transmitted from the application running on the application server 20 e.g. via Ethernet link to the HAG 30, where the multiplexer (MUX) is controlled to distribute this data flow to the user-space 301 LEAP function, from where it is forwarded via access infrastructure 25 to the UE 10. Here, the data flow is received and processed in the userspace 101 LEAP function.

A similar result is achieved in the 5G RGW-based multi-connectivity architecture as shown in FIGS. 7A/B. Again, when considering the DL direction for the data flows, a dashed line indicate a data flow for e.g. Youtube video transfer (for best-effort capacity aggregation) using (standard) MPTCP function deployed in the OS kernel. That is, the data flow is transmitted from the application running on the application server 20 e.g. via Ethernet link to the HAG 30, where the multiplexer (MUX) is controlled to distribute this data flow to the kernel-space 302 MPTCP function. In the example of FIGS. 7A/B, the data flow is forwarded via access infrastructure 25 to the RGW 40. Here, the data flow is received and processed in the kernel-space 142 MPTCP function. The RGW 40 forwards then the data flow to the UE 10 via link 26.

Furthermore, the solid line indicates a data flow for e.g. Youtube video transfer using non-standard MPTCP with asymmetric routing in user space. Hence, the data flow is transmitted from the application running on the application server 20 e.g. via Ethernet link to the HAG 30, where the multiplexer (MUX) is controlled to distribute this data flow to the user-space 301 asymmetric routing function. In the example of FIGS. 7A/B, the data flow is forwarded via access infrastructure 25 to the RGW 40. Here, the data flow is received and processed in the user-space 141 asymmetric routing function. The RGW 40 forwards then the data flow to the UE 10 via link 26.

The dotted line indicates a data flow for e.g. Skype communications using LEAP. The data flow is transmitted from the application running on the application server 20 e.g. via Ethernet link to the HAG 30, where the multiplexer (MUX) is controlled to distribute this data flow to the user-space 301 LEAP function. In the example of FIGS. 7A/B, the data flow is forwarded via access infrastructure 25 to the RGW 40. Here, the data flow is received and processed in the user-space 141 LEAP function. The RGW 40 forwards then the data flow to the UE 10 via link 26.

Referring back to the transmission control procedure shown in FIGS. 2 and 3, as a next measure in the network slicing processing according to examples of embodiments of the invention, the protected delivery of the application data flow is executed. For the protected delivery, it is in particular required to ensure 5 that there is no interaction between the respective network slices. For achieving this, a slice flow isolation is executed.

As described above, slice flow isolation can be achieved, for example, on one of layers 1 to 4 of the network protocol stack, i.e. the physical layer (layer 1), the data link (MAC) layer (layer 2), the network (IP) layer (layer 3) and the transport layer (layer 4). In the following, several options for achieving the slice flow isolation on a respective layer according to examples of embodiments will be described.

Figure 8:
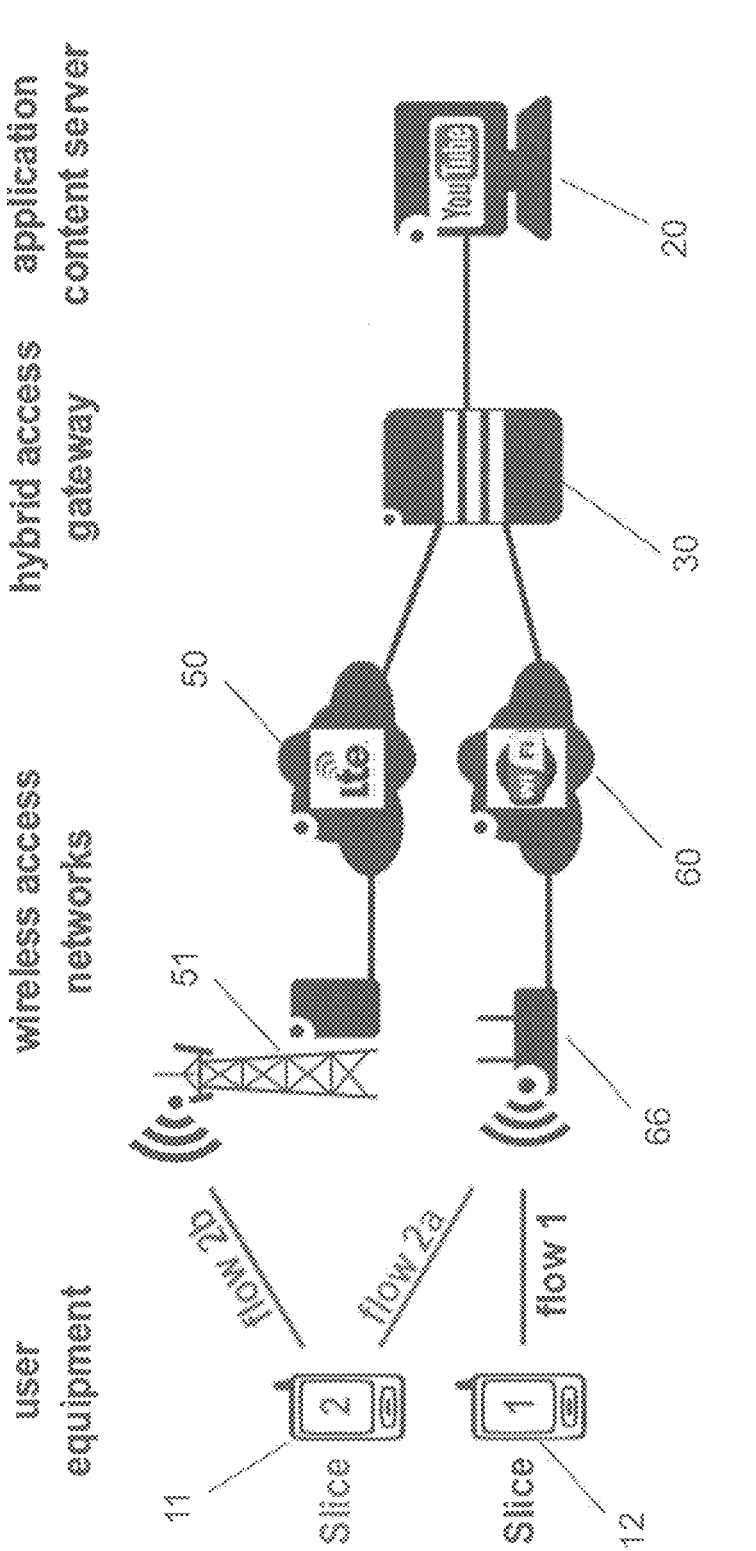
FIG. 8 illustrates an implementation of a data transmission control procedure according to some examples of embodiments.

FIG. 8 illustrates an implementation of a data transmission control procedure according to some examples of embodiments in a network configuration example of FIGS. 5A/B. Specifically, FIG. 8 shows a multi-connectivity scenario with user applications associated with two network slices 1 and 2.

As shown in FIG. 8, UE 11 receives/sends a data flow 1 from/to an application server 20, and UE 12 receives/sends a data flow 2 from/to the application server 20. For the data flow transmission, wireless access network 50/51 (e.g. a mobile communication network access network with a BS 51 and a CN 50) and access network 60/66 (e.g. a Wifi access network with a router 66 and a backhaul network 60) are available. A HAG 30 is used for executing a transmission control according to examples of embodiments of the invention.

One option for slice flow isolation in a scenario like that shown in FIG. 8 is an isolation of layer 1 (physical layer). For example, when multiple gateways with independent backhaul are available, as it is the case in FIG. 8 by means of the Wifi access and the LTE access networks, disjoint/asymmetric routing paths can be configured. As a result, for example, slice 1 is using flow 1 for delivery via Wifi access 60/66 and slice 2 is using flow 2b for delivery via LTE access 50/51. In other words, different fixed/wireless access technologies is are used for isolating the slice flows.

It is to be noted that such disjoint/asymmetric routing paths can be used also as an alternative or additive measure in other slice flow isolation processing for preventing undesirable slice interaction.

As another option, which is also indicated in FIG. 8, slice flow isolation on the transport layer (layer 4) can be effected.

Basically, application data flows can be accommodated in network slices that use mutually exclusive network resources to prevent destructive interaction among active slices (i.e. for achieve the protected delivery).

In the present example for slice flow isolation, it is assumed that for data flows like Youtube video data flow (see also examples in FIGS. 5 and 6) both kernel-space MPTCP flows with symmetric routing and user-space MPTCP flows with asymmetric routing are mapped into a TCP-based capacity-oriented slice (CAP), characterized by pre-defined targets for average data rate but no constraints on packet delivery latency. On the other hand, user-space LEAP flows are mapped into the UDP-based latency-oriented slice (LAT) in which data flows are subject to both capacity and latency constraints (e.g. packets have to be delivered within 100 ms with a reliability of 95%).

Now, in order to isolate the two slices (i.e. the CAP and the LAT slices), the HAG 30 is configured to control the data rate of the TCP flows by capping the sender congestion window (CWND) for downlink traffic and advertised receiver window (RWND). For the UDP traffic, an explicit rate control is used.

According to examples of embodiments, values for CWND and RWND are set not to exceed collectively, individually, or in combinations a maximum permissible value, defined for each base station and backhaul network. For example, in the example of FIG. 8, two applications belonging to the different slices 1 and 2 are supposed to share fairly the LTE and Wifi bandwidth. For achieving this, the following set of linear constraints are considered for setting CWND caps:

CWND_max_flow_1=CWND_max_flow_2a+ CWND_max_flow_2b (this means that the maximum value of the CWND for flow 1 is equal to the sum of the maximum value of 35 the CWND for flow 2a and the maximum value of the CWND for flow 2b).

CWND_max_flow_1+CWND_max_flow_2a+ CWND_max_flow_2b<=Hybrid_access_gateway_capacity (this means that the sum of the maximum value of the CWND for flow 1 and the maximum value of the CWND for flow 2a and the maximum value of the CWND for flow 2b have to consider the capacity of the HAG 30)

CWND_max_flow_1+ CWND_max_flow_2a<=Wifi_access_point_capacity (this means that the sum of the maximum value of the CWND for flow 1 and the maximum value of the CWND for flow 2a have to consider the capacity of the Wifi access point 60/66).

CWND_max_flow_2b<=LTE_base_station_capacity (this means that the maximum value of the CWND for flow 2b has to consider the capacity of the LTE BS 50/51).

CWND_max_flow_1<=Wifi_link_capacity_flow_1 (this means that the maximum value of the CWND for flow 1 has to consider the capacity of the Wifi link used for flow 1).

CWND_max_flow_2a<=Wifi_link_capacity_flow_2a (this means that the maximum value of the CWND for flow 2a has to consider the capacity of the Wifi link used for flow 2a).

CWND_max_flow_2b<=LTE_link_capacity_flow_2b (this means that the maximum value of the CWND for flow 2b has to consider the capacity of the LTE link used for flow 2b).

According to a further example, which is indicated in FIG. 8, it is assumed that slice 1 has to deliver its data subject to latency constraints. To this end, the CWND parameters of slice 2 are reduced such that the queuing delay in the Wifi access point 60/66 does not exceed the maximum round-trip time (RTT). More specifically, the RTT of links used by slice 2 has to be smaller than a pre-defined data delivery deadline.

This is illustrated in the following example of a program part for implementing this slice flow isolation processing:

```
if
    RTT_min___flow _1 < Delivery_deadline___flow_1
then
    reduce CWND_max___flow_2a until
        • 0.5* RTT___flow_2a <= Delivery_deadline___flow_1
    increase CWND_max___flow_2b until
        • CWND_max___flow_2a + CWND_max___flow_2b >=
          Bandwidth_target___flow_1
End
```

Figure 9:
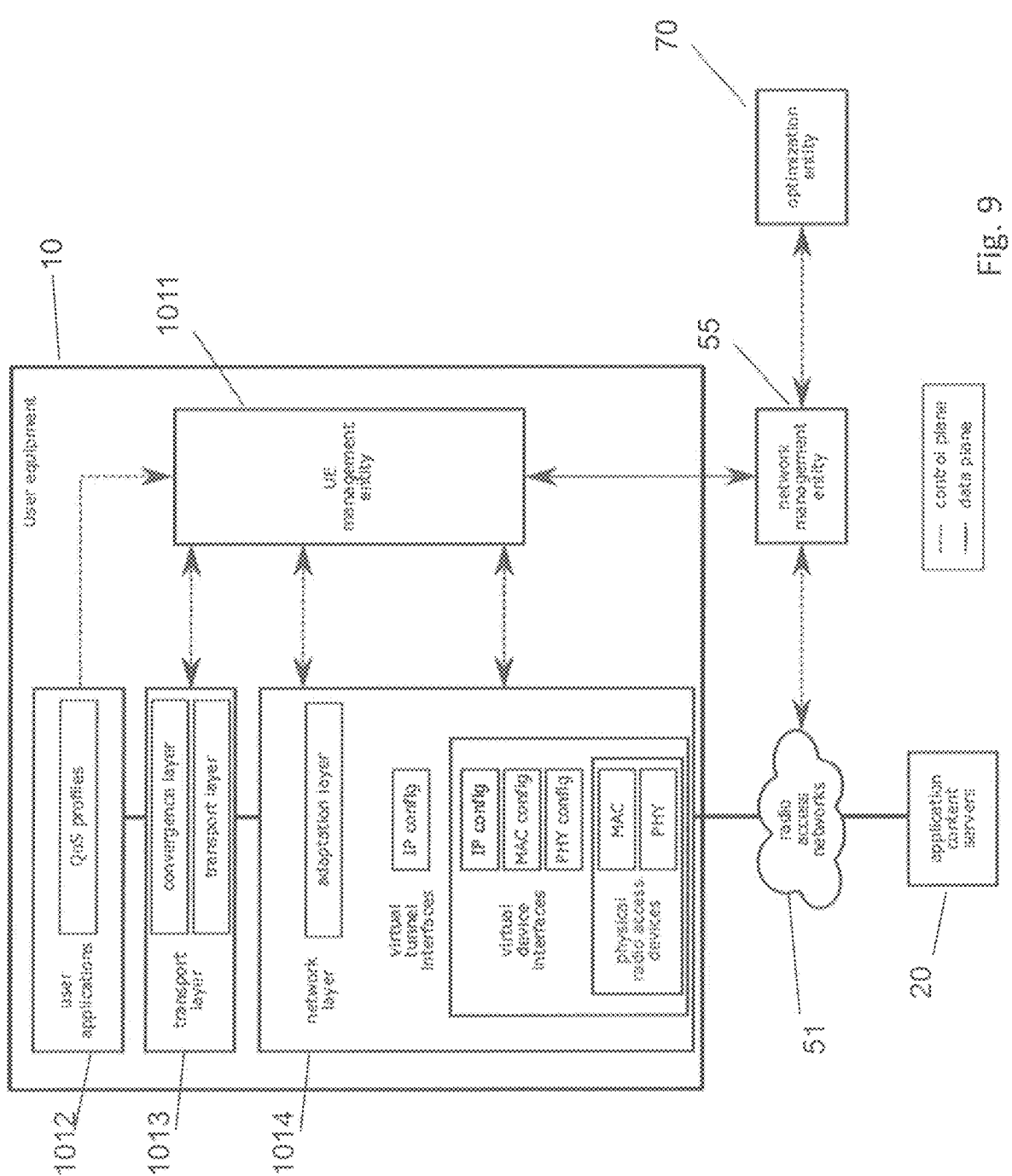
FIG. 9 shows a diagram illustrating an example of a network configuration where a data transmission control procedure according to some examples of embodiments is implementable.
Figure 10:
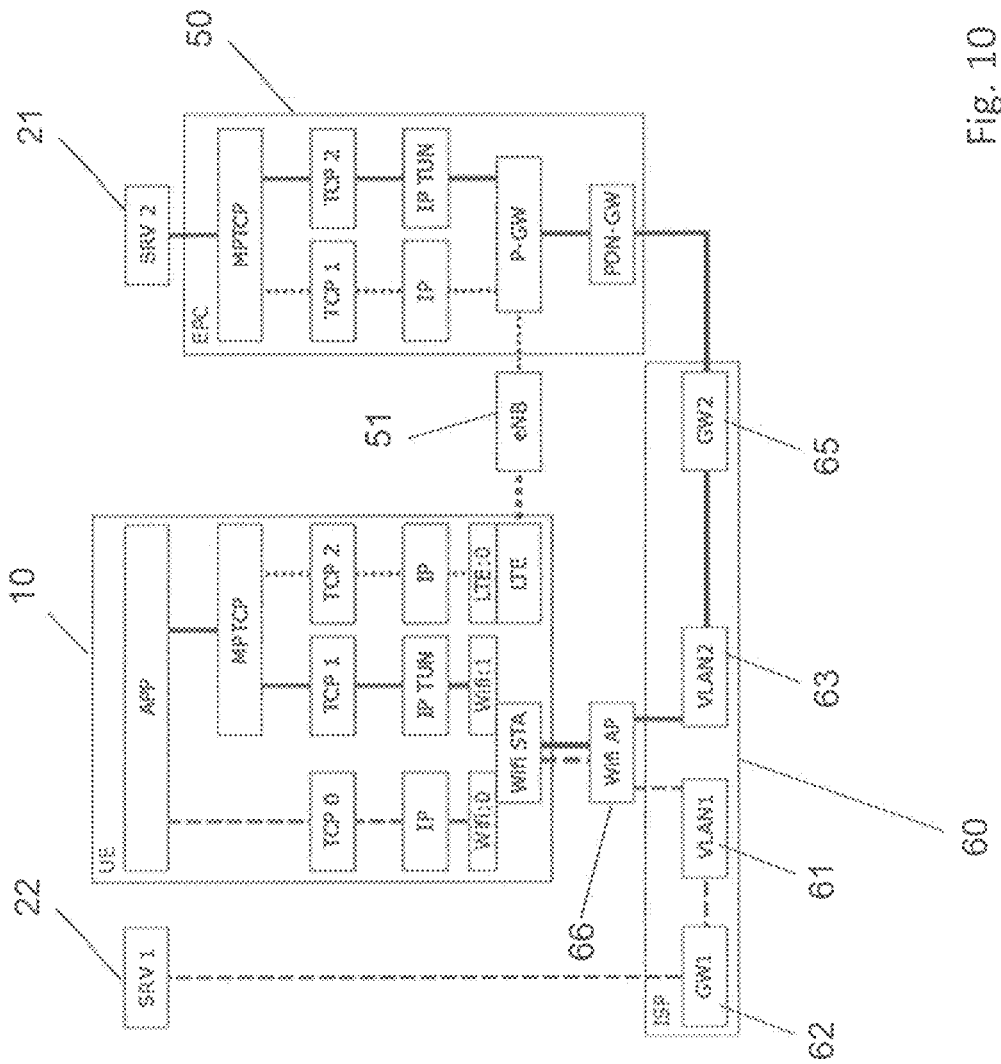
FIG. 10 illustrates an implementation of a data transmission control procedure according to some examples of embodiments.

Next, as another option for achieving a slice flow isolation, a processing related to layer 2 (MAC layer) and layer 3 (IP layer) is described with reference to FIGS. 9 and 10. FIG. 9 shows a diagram illustrating an example of a network configuration where a data transmission control procedure according to some examples of embodiments is implementable, and FIG. 10 illustrates an implementation of a data transmission control procedure according to some examples of embodiments based on the configuration illustrated in FIG. 9.

In the following example of embodiments of the invention, it is assumed that the application data can be delivered to/from a user equipment (UE) by using at least one of virtual tunnel interfaces and virtual device interfaces. Virtual tunnel interfaces enable flexible network-layer tunneling, while virtual device interfaces enable a flexible configuration of shared physical devices for radio access (e.g. Wifi or LTE transceiver).

The idea behind these virtual interfaces is that it is desirable to have a wireless device connect to multiple networks simultaneously. By using virtual interfaces, it is possible to avoid the necessity to use, for example, multiple wireless network cards in a device. Instead. a software based approach can be employed which facilitates simultaneous connections to multiple networks by virtualizing a single (physical) wireless access device.

Specifically, the wireless access device is virtualized by introducing an intermediate layer below IP, which continuously switches the access device across multiple networks. The switching is transparent to the user who only sees a connection to multiple networks. Such a virtualization of interfaces requires changes to the data link or device driver layer of the networking stack. It creates and manages multiple network stacks and maintains the associated state information for each network that the access device is connected to. Simultaneous connectivity over all networks is achieved by switching the access device between the desired networks and activating the corresponding stack. An advantage of this architecture is that it allows applications and protocols like TCP/IP to work without any changes.

In the following example, it is assumed that slice-specific VLAN or MPLS networks are configured. For example, in an LTE network, the mapping into different VLANs is achieved by assigning flows into bearers with a suitable QoS Class Identifier. On the other hand, in a Wifi network, VLAN traffic can be selected directly at the Wifi routers or by associating different Wifi SSIDs with different VLANs.

FIG. 9 illustrates a corresponding tunnel and device virtualization concept. Specifically, as indicated in FIG. 9, the UE 10 is associated with a UE management entity 101. User application layer 102 with QoS profiles, transport layer 103 including convergence layer and transport layer, and network layer 104 with adaptation layer are connected to the UE management entity 101. Virtual tunnel interfaces based on a corresponding IP configuration and virtual device interfaces with IP, MAC and PHY configurations are generated below network (IP) layer 104. By means of these interfaces, connection to application server 20 via RAN 51 can be established (data place connection, indicated by solid lines). Furthermore, as shown in FIG. 9, a network management entity 55 and an optimization entity 70 are provided which are involved in the creation of the virtual interfaces (control place connections, indicated by dashed lines).

Thanks to their software-defined nature, both types of interfaces (i.e. the virtual tunnel interfaces and the virtual device interfaces) can be easily and dynamically (re)-configured to enforce application/network-specific optimization objectives such as network-wide load balancing respecting application-specific QoS requirements by means of local congestion control and traffic steering. To this end, the UE management entity 101 controls the creation and configuration of a virtual interface in the UE 10 as well as their binding to network sockets based on application/network-specific inputs. The network management entity 55 carries out associated control tasks in the radio access networks (e.g. tunnel termination) as well as distributes control feedback to the UE management entity 101. Furthermore, the network optimization entity 70 defines and enforces network optimization objectives in collaboration with the UE management entity 101 and the network management entity 55.

FIG. 10 illustrates an implementation of a data transmission control procedure according to some examples of embodiments in a network configuration 5 example based on FIG. 9. Specifically, FIG. 10 shows a multi-connectivity scenario with user applications associated with two network slices.

The example according to FIG. 10 executes a slice flow isolation on layers 2 (MAC layer) and/or layer 3 (IP layer). In detail, in the present example, slice-specific VLAN and MPLS networks are configured. As indicated above, in mobile communication networks like LTE networks, the mapping into different VLANs is achieved by assigning the flows into bearers with a suitable QoS Class Identifier. In Wifi networks, VLAN traffic can be selected directly at the Wifi routers or by associating different Wifi SSIDs with different VLANs.

This is illustrated in FIG. 10. Specifically, the user application (APP) in UE 10 communicates with two servers (SRV) 21 and 22. The first server 22 (SRV 1) delivers, for example, lower-priority data, such as advertisements, over a low-priority data flow (indicated by a dashed line), wherein for the transport thereof a standard TCP protocol for single-path communications (TCP 0) is used. The second server 21 (SRV 2) delivers actual application content (for example, a Youtube video). In order to improve the user experience, the associated data flow is transported by using e.g. the MTPCP protocol for multi-path communications, wherein the capacity of both UE interfaces, i.e. the mobile communication network interface (such as LTE interface using eNB 51) and Wifi interface (using a Wifi access point (AP) 66), is aggregated. In the example of FIG. 10, the MPTCP function (in both the UE 10 and the EPC 50) acts as a transport-layer aggregator function that divides the application data flow into two TCP subflows (TCP 1 and 2), which are indicated by solid lines and dotted lines.

A UE management entity (provided e.g. by a HAG) controls the creation and configuration of the virtual interfaces in the UE as well as their binding to network sockets based on application/network-specific inputs. These are delivered, for example, from a network optimization entity by a network management entity.

In the example according to FIG. 10, the network socket of the "TCP 2" subflow (dotted line) of the MPTCP session is bound (by the UE management entity) to a virtual LTE interface (LTE:0) that routes data via the eNB 51 to an MPTCP proxy located in the LTE EPC. In accordance with examples of embodiments, the virtual LTE interface can configure a low-latency bearer by selecting an appropriate QoS class identifier (QCI).

On the other hand, the Wifi station device (STA) in the UE 10 is virtualized as well, as described above. For example, two virtual Wifi interfaces (Wifi:0 and Wifi:1) configure the shared Wifi device to deliver wireless data in an application-specific manner. For example, it is possible to select a suitable Wifi subnetwork by controlling the Wifi SSID or configure a specific gateway. Specifically, as shown in FIG. 10, the virtual Wifi interfaces configure the Wifi SSID such that a suitable gateway (GW) within a virtual local area network (VLAN) is selected. More specifically, the network socket of the parallel "TCP 1" subflow (solid lines in FIG. 10) of the MPTCP session is delivered over Wifi into the MPTCP proxy in the LTE EPC 50. To traverse the public data network gateway (PDNGW) for non-3GPP access, the UE management entity can create, for example, a GRE tunnel (for the connection between Wifi STA in UE 10 via Wifi AP 66, VLAN2 63, GW2 65 to PDN-GW and P-GW in EPC 50). That is, the GRE tunnel is mapped onto the interface "Wifi:1" that configures the Wifi SSID such that the GRE tunnel data is delivered by high-performance VLAN2 63 for priority traffic to a QoS-aware gateway GW 2 65 in the ISP network 60. On the other hand, the virtual interface "Wifi:0" offloads the lowpriority "TCP 0" flow (dashed lines in FIG. 10), for example, to a best-effort VLAN1 61 served by a low-performance gateway GW 1 62.

As described above, in a slice flow isolation processing as discussed in connection with FIG. 10, a slice flow isolation on layer 2 (MAC layer) uses shared physical devices wherein the traffic of the data flows to be transmitted is distributed via different VLANs, while slice flow isolation on layer 3 (IP layer) uses shared physical devices wherein the traffic of the data flows to be transmitted via different routing gateways.

With the above described measures for isolating the slice flows, a protected delivery of the data to be transmitted using the respective network slices is possible, wherein the required slice resources are then (dynamically) allocated to the slices according to the demands of the application.

Figure 11:
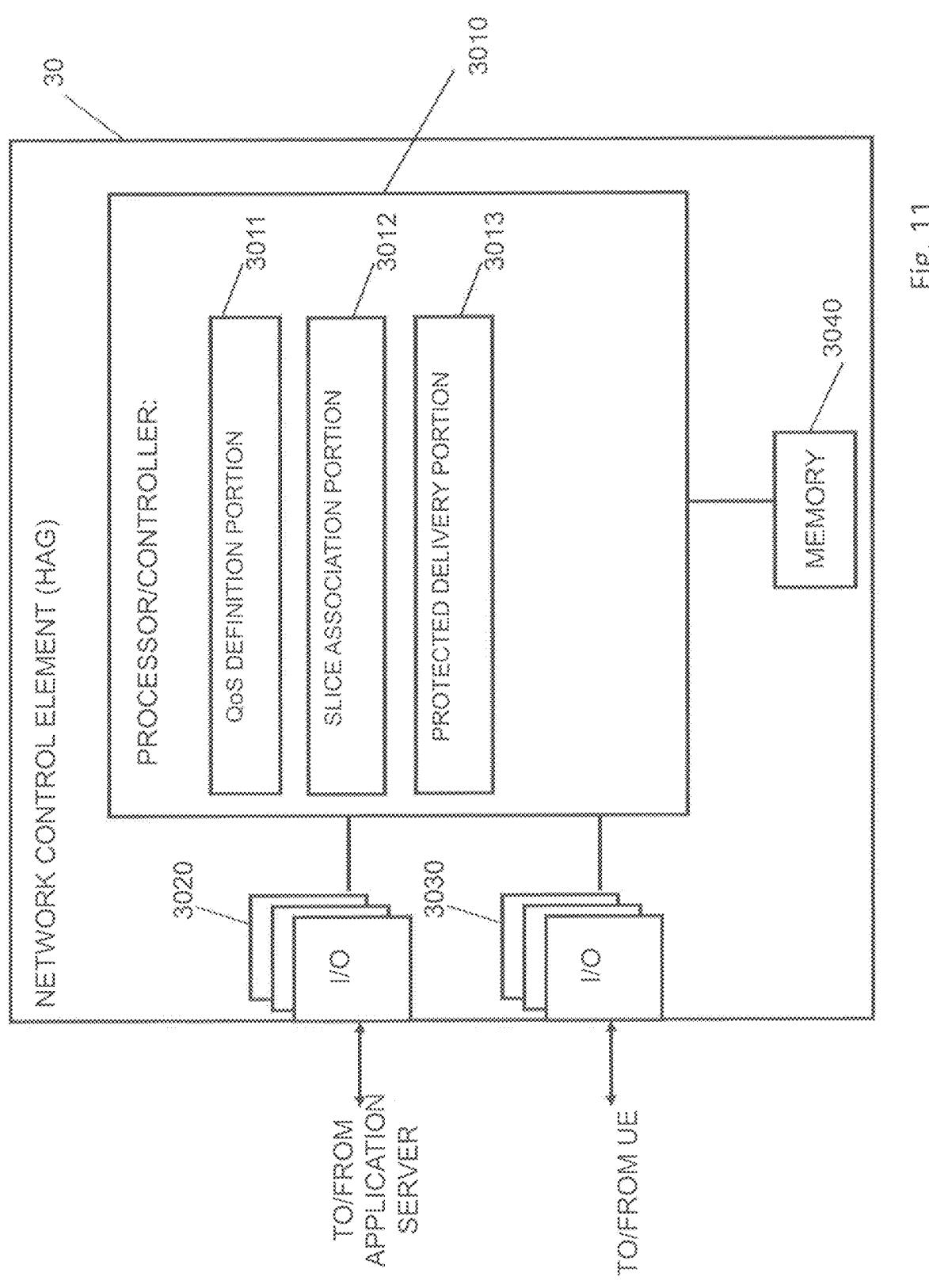
FIG. 11 shows a diagram of a network element or function acting as a controller for a data transmission control procedure according to some examples of embodiments.

FIG. 11 shows a diagram of a network control element or function configured to execute a communication control procedure according to some examples of embodiments, e.g. as the HAG 30, which is configured to implement a procedure for controlling the transmission of data flows as described in connection with some of the examples of embodiments. It is to be noted that the control element or function, like the HAG 30 of FIG. 4A/B or 5A/B, may include further elements or functions besides those described herein below. Furthermore, even though reference is made to a network control element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The network control element 30 shown in FIG. 11 may include a processing circuitry, a processing function, a control unit or a processor 3010, such as a CPU or the like, which is suitable for executing instructions given by programs or the like related to the transmission control procedure. The processor 3010 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 3020 and 3030 denotes input/output (I/O) units or functions (interfaces) connected to the processor or processing function 3010. The I/O units 3020 may be used for communicating with application content servers, such as server 20, as described in connection with FIG. 4A/B or 5A/B, for example. The I/O units 3030 may be used for communicating with the UE 10 (or RGW 40), as described in connection with FIG. 4A/B or 5A/B, for example. The I/O units 3020 and 3030 may be a combined unit including communication equipment towards several entities, or may include a distributed structure with a plurality of different interfaces for different entities. Reference sign 3040 denotes a memory usable, for example, for storing data and programs to be executed by the processor or processing function 3010 and/or as a working storage of the processor or processing function 3010. It is to be noted that the memory 3040 may be implemented by using one or more memory portions of the same or different type of memory.

The processor or processing function 3010 is configured to execute processing related to the above described transmission control processing. In particular, the processor or processing circuitry or function 3010 includes one or more of the following sub-portions. Sub-portion 3011 is a processing portion which is usable as a portion for defining a QoS setting. The portion 3011 may be configured to perform processing according to S100 of FIG. 2 or S100*a* of FIG. 3. Furthermore, the processor or processing circuitry or function 3010 may include a sub-portion 3012 usable as a portion for associating a network slice. The portion 3012 may be configured to perform a processing according to S110 of FIG. 2 or S110*a* and S110*b* of FIG. 3. In addition, the processor or processing circuitry or function 3010 may include a sub-portion 3013 usable as a portion for causing a protected delivery. The portion 3013 may be configured to perform a processing according to S120 of FIG. 2 or S120*a* and S120*b* of FIG. 3. It is to be noted that examples of embodiments of the invention are applicable to various different network configurations. In other words, the examples shown in the above described figures, which are used as a basis for the above discussed examples, are only illustrative and do not limit the present invention in any way. That is, additional further existing and proposed new functionalities available in a corresponding operating environment may be used in connection with examples of embodiments of the invention based on the principles defined.

According to a further example of embodiments, there is provided, for example, an apparatus for use by a core network control element or function configured to execute a control of a transmission of a data flow in a communication network, the apparatus comprising means configured to define a quality of service setting for at least one data flow to be transmitted in the communication network, means configured to associate at least one network slice to the at least one data flow to be transmitted, wherein the at least one network slice consists of at least one data transport service using communication resources of the communication network, and means configured to cause a protected delivery of the at least one data flow by using the associated network slice.

Furthermore, according to some other examples of embodiments, the above defined apparatus may further comprise means for conducting at least one of the processing defined in the above described methods, for example a method according that described in connection with FIG. 2 or FIG. 3.

It should be appreciated that an access technology via which traffic is transferred to and from an entity in the communication network may be any suitable present or future technology, such as WLAN (Wireless Local Access Network), WiMAX (Worldwide Interoperability for Microwave Access), LTE, LTE-A, 5G, Bluetooth, Infrared, and the like may be used; additionally, embodiments may also apply wired technologies, e.g. IP based access technologies like cable networks or fixed lines.

embodiments suitable to be implemented as software code or portions of it and being run using a processor or processing function are software code independent and can be specified using any known or future developed programming language, such as a high level programming language, such as objective-C, C, C++, C#, Java, Python, Javascript, other scripting languages etc., or a low-level programming language, such as a machine language, or an assembler.

implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).

embodiments may be implemented as individual devices, apparatuses, units, means or functions, or in a distributed fashion, for example, one or more processors or processing functions may be used or shared in the processing, or one or more processing sections or processing portions may be used and shared in the processing, wherein one physical processor or more than one physical processor may be used for implementing one or more processing portions dedicated to specific processing as described, an apparatus may be implemented by a semiconductor chip, a chipset, or a (hardware) module including such chip or chipset;

embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.

embodiments may also be implemented as computer program products, including a computer usable medium having a computer readable program code embodied therein, the computer readable program code adapted to execute a process as described in embodiments, wherein the computer usable medium may be a non-transitory medium.

Although the present invention has been described herein before with reference to particular embodiments thereof, the present invention is not limited thereto and various modifications can be made thereto.

The invention claimed is:

1. A method, comprising defining a quality of service setting for at least one data flow to be transmitted in a communication network, including setting, by using at least one of a default application profile, a dynamic operator policy, and an on-demand user command, a minimum quality of service based on at least one of: requirements of an operator of the communication network, requirements indicated by a user involved in a communication comprising the transmission of the at least one data flow, and requirements indicated by profile settings of an application involved in a communication comprising the transmission of the at least one data flow, translating parameters corres ponding to the quality of service setting into a selection of a suitable transport protocol belonging to at least one network slice, defining a transport protocol belonging to the at least one network slice, wherein the transport protocol uses communication resources of the communication network, selecting a network module for implementing a generation of data flow packets to be transmitted in the at least one network slice, and causing a protected delivery of the at least one data flow by using the at least one network slice.

2. The method according to claim 1, wherein the at least one network slice is at least one of a capacity-oriented network slice giving priority of an amount of data to be transmitted or a latency-oriented network slice giving priority of a latency of data transmission.

3. The method according to claim 1, wherein the transport protocol belonging to the at least one network slice is related to at least one of a multi-connectivity service for best-effort capacity aggregation, a multi-connectivity service for quality of service aware capacity aggregation, and a complementary service for asymmetric data routing.

4. An apparatus for use by a core network control element or function configured to execute a control of a transmission of a data flow in a communication network, the apparatus comprising at least one processing circuitry, and at least one memory for storing instructions to be executed by the processing circuitry, wherein the at least one memory and the instructions are configured to, with the at least one processing circuitry, cause the apparatus at least:

to define a quality of service setting for at least one data flow to be transmitted in the communication network, including setting, by using at least one of a default application profile, a dynamic operator policy, and an on-demand user command, a minimum quality of service based on at least one of: requirements of an operator of the communication network, requirements indicated by a user involved in a communication comprising the transmission of the at least one data flow, and requirements indicated by profile settings of an application involved in a communication comprising the transmission of the at least one data flow, to translate parameters corresponding to the quality of service setting into a selection of a suitable transport protocol belonging to at least one network slice, to define a transport protocol belonging to the at least one network slice, wherein the transport protocol uses communication resources of the communication network, to select a network module for implementing a generation of data flow packets to be transmitted in the at least one network slice, and to cause a protected delivery of the at least one data flow by using the at least one network slice.

5. The apparatus according to claim 4, wherein the at least one network slice is a capacity-oriented network slice giving priority of an amount of data to be transmitted, or a latency-oriented network slice giving priority of a latency of data transmission.

6. The apparatus according to claim 4, wherein the transport protocol belonging to the at least one network slice is related to at least one of a multi-connectivity service for best-effort capacity aggregation, a multi-connectivity service for quality of service aware capacity aggregation, and a complementary service for asymmetric data routing.

7. The apparatus according to claim 4, wherein the at least one memory and the instructions are further configured to, with the at least one processing circuitry, cause the apparatus at least to select as the network module for implementing the generation of data flow packets at least one of:

a kernel-space service of at least one network element or function involved in a communication comprising the transmission of the at least one data flow, a user-space function implemented and running in at least one network element or function involved in a communication comprising the transmission of the at least one data flow, and a kernel-space service of at least one network element or function involved in a communication comprising the transmission of the at least one data flow and a user-space function implemented and running in the at least one network element or function involved in the communication comprising the transmission of the at least one data flow.

8. The apparatus according to claim 4, wherein the at least one memory and the instructions are further configured to, with the at least one processing circuitry, cause the apparatus at least:

when causing the protected delivery of the at least one data flow by using the at least one network slice, to isolate slice flows for transmitting the data flow via mutually exclusive resources of the communication network; and to allocate resources of the communication network to the at least one network slice for transmitting the data flow.

9. The apparatus according to claim 8, wherein slice flows for transmitting the data flow are isolated on one of a physical layer, a data link layer, a network layer, and a transport layer of a communication function layer model of the communication network.

10. The apparatus according to claim 9, wherein the at least one memory and the instructions are further configured to, with the at least one processing circuitry, cause the apparatus at least:

to isolate the slice flows for transmitting the data flow on the physical layer by using different access technologies for respective slice flows, on the data link layer by generating connections to different virtual local area networks for respective slice flows, on the network layer by providing paths to different paths to gateways for respective slice flows, or on the transport layer by controlling a data rate for data transmission by setting at least one state variable of the transport layer to a specified value.

11. The apparatus according to claim 10, wherein the at least one memory and the instructions are further configured to, with the at least one processing circuitry, cause the apparatus at least:

to isolate the slice flows for transmitting the data flow on the data link layer and the network layer by multiplexing at least one of virtual access devices, delivery tunnels and subnetworks and on the transport layer by controlling at least one of congestion windows and advertised receiver windows.

12. The apparatus according to claim 8, wherein the at least one memory and the instructions are further configured to, with the at least one processing circuitry, cause the apparatus at least:

when allocating resources of the communication network to the at least one network slice for transmitting the data flow, to dynamically allocate the resources of the communication network to the isolated slice flows in accordance with traffic requirements for the protected delivery of the data flow.

13. The apparatus according to claim 4, wherein the apparatus is implemented in at least one of a network control element or function of the communication network for multi connectivity communication, the network control element or function comprising at least one of a communication element or function acting as a user equipment, a core network control element or function, an access network element or function, a gateway network element or function, a hybrid access gateway element or function, and a residential gateway element or function.

14. A non-transitory computer-readable medium on which software code portions are stored, wherein the software code portions, when run on a computer, perform:

defining a quality of service setting for at least one data flow to be transmitted in a communication network, including setting, by using at least one of a default application profile, a dynamic operator policy, and an on-demand user command, a minimum quality of service based on at least one of: requirements of an operator of the communication network, requirements indicated by a user involved in a communication comprising the transmission of the at least one data flow, and requirements indicated by profile settings of an application involved in a communication comprising the transmission of the at least one data flow, translating parameters corresponding to the quality of service setting into a selection of a suitable transport protocol belonging to at least one network slice, defining a transport protocol belonging to the at least one network slice, wherein the transport protocol uses communication resources of the communication network, selecting a network module for implementing a generation of data flow packets to be transmitted in the at least one network slice, and causing a protected delivery of the at least one data flow by using the at least one network slice.

* * * * *